US012448774B2

(12) United States Patent
Bischel et al.

(10) Patent No.: US 12,448,774 B2
(45) Date of Patent: Oct. 21, 2025

(54) DIMENSIONALLY STABLE BUILDING PANEL

(71) Applicant: ARMSTRONG WORLD INDUSTRIES, INC., Lancaster, PA (US)

(72) Inventors: Marsha S. Bischel, Lancaster, PA (US); Ying Chang, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 18/132,764

(22) Filed: Apr. 10, 2023

(65) Prior Publication Data

US 2023/0243153 A1 Aug. 3, 2023

Related U.S. Application Data

(62) Division of application No. 16/817,459, filed on Mar. 12, 2020, now Pat. No. 11,649,631.

(60) Provisional application No. 62/817,847, filed on Mar. 13, 2019.

(51) Int. Cl.

| | |
|---|---|
| ***E04C 2/296*** | (2006.01) |
| ***B32B 3/26*** | (2006.01) |
| ***B32B 5/08*** | (2006.01) |
| ***B32B 21/10*** | (2006.01) |
| ***E04B 1/86*** | (2006.01) |
| ***E04B 1/94*** | (2006.01) |

(52) U.S. Cl.

CPC .............. *E04C 2/296* (2013.01); *B32B 3/266* (2013.01); *B32B 5/08* (2013.01); *B32B 21/10* (2013.01); *E04B 1/86* (2013.01); *E04B 1/942* (2013.01); *B32B 2250/40* (2013.01); *B32B 2307/718* (2013.01)

(58) Field of Classification Search

CPC . E04C 2/296; E04B 1/86; E04B 1/942; E04B 9/045; E04B 9/34; E04B 9/366; E04B 1/84; E04B 1/8209; E04B 9/36; E04B 9/363; E04B 2001/8433; E04B 2001/8461; B32B 3/266; B32B 5/08; B32B 21/10; B32B 2250/40; B32B 2307/718

USPC ...................................................... 428/68, 74

See application file for complete search history.

(56) References Cited

U.S. PATENT DOCUMENTS 1,726,500 A * 8/1929 Norris ....................... E04B 9/26 52/762

2,055,032 A 9/1936 Johnson (Continued)

FOREIGN PATENT DOCUMENTS

| | | | |
|---|---|---|---|
| CN | 20217986 | U | 2/2012 |
| EP | 2963199 | A1 | 1/2016 |

(Continued)

OTHER PUBLICATIONS

Translation of WO 2012/137353A1. (Year: 2012).*

*Primary Examiner* — Catherine A. Simone
(74) *Attorney, Agent, or Firm* — Patrick Sheldrake

(57) ABSTRACT

Described herein is a building panel and related building systems, the building panel having a first major surface opposite a second major surface, the building panel comprising a core comprising a first body comprising a first fibrous material; and a second body comprising a second fibrous material, a veneer facing layer coupled to the core, the veneer facing layer comprising a plurality of perforations.

18 Claims, 9 Drawing Sheets

(56) References Cited

U.S. PATENT DOCUMENTS

| | | | | | |
|---|---|---|---|---|---|
| 2,160,638 | A | * | 5/1939 | Bedell | E04B 9/34<br>181/295 |
| 2,414,533 | A | | 1/1947 | Johnston | |
| 2,897,908 | A | * | 8/1959 | Barshefsky | E04B 1/84<br>52/145 |
| 3,037,578 | A | | 6/1962 | Jack | |
| 4,073,108 | A | | 2/1978 | Williams | |
| 4,200,171 | A | * | 4/1980 | Seymour | E04B 1/86<br>181/291 |
| 5,009,043 | A | | 4/1991 | Kurrasch | |
| 8,695,286 | B2 | | 4/2014 | Bergman | |
| 9,691,370 | B1 | | 6/2017 | Stone | |
| 10,359,163 | B1 | * | 7/2019 | Hettwer | F21S 4/28 |
| 2011/0232219 | A1 | | 9/2011 | Wilkinson, Jr. | |

FOREIGN PATENT DOCUMENTS

| | | | | | |
|---|---|---|---|---|---|
| EP | 1698452 | A1 | | 3/2025 | |
| GB | 906463 | | | 9/1962 | |
| GB | 2170861 | A | * | 8/1986 | E04B 1/86 |
| GB | 2182481 | A | * | 5/1987 | E04B 9/045 |
| WO | WO-2012137353 | A1 | * | 10/2012 | G10K 11/168 |
| WO | WO 2013/159240 | A1 | | 10/2013 | |

* cited by examiner

DIMENSIONALLY STABLE BUILDING PANEL

CROSS-REFERENCE TO RELATED APPLICATIONS

This application is a divisional of U.S. patent application Ser. No. 16/817,459, filed on Mar. 12, 2020, which claims the benefit of U.S. Provisional Application No. 62/817,847, filed on Mar. 13, 2019. The disclosure of each of the above application is incorporated herein by reference in its entirety for all purposes.

BACKGROUND

Building panels previously formed from wooden materials deflect and/or permanently deform when exposed to extreme environmental temperatures and humidity. The result is a building system that is visually objectionable. Therefore, a need exists to create a dimensionally stable building panel that resembles the wooden panels without raising weight concerns.

BRIEF SUMMARY

The present invention includes a building panel having a first major surface opposite a second major surface, the building panel comprising: a core comprising: a first body comprising a first fibrous material; and a second body comprising a second fibrous material; and a veneer facing layer coupled to the core, the veneer facing layer comprising a plurality of perforations.

In other embodiments, the present includes a building panel having a first major surface opposite a second major surface, the building panel comprising: a core comprising: a first porous body; a second porous body; and an interface between the first and second porous body, wherein an adhesive is present in the interface; and a veneer facing layer formed of a cellulosic material, the veneer facing layer having an outer surface opposite an inner surface, the veneer facing layer comprising a plurality of perforations extending between the inner and our surface of the veneer facing layer.

In other embodiments, the present invention includes a building panel having a first major surface opposite a second major surface and a side surface extending there-between, the building panel comprising: a core comprising a first major surface opposite a second major surface and a side surface extending between the first and second major surfaces of the core, the core further comprising: a first body having a first major surface opposite a second major surface and a side surface extending between the first and second major surfaces of the first body, the first body comprising a first fibrous material; and a second body having a first major surface opposite a second major surface and a side surface extending between the first and second major surfaces of the second body, the second body comprising a second fibrous material; a first interface located between the first major surface of the first body and the second major surface of the second body, and the first interface comprises a first adhesive; a veneer facing layer having an inner surface opposite an outer surface and formed from a cellulosic material, the veneer facing layer comprising: a first portion coupled to the core such that a second interface is located between the inner surface of the first portion of the veneer facing layer and the second major surface of the first body, and second interface comprises a second adhesive; a second portion coupled to the core such that a third interface is located between the inner surface of the second portion of the veneer facing layer and the first major surface of the second body, and third interface comprising a third adhesive.

Other embodiments of the present invention include a ceiling system comprising a support structure; and at least one of the building panels previously described.

Other embodiments of the present invention include a ceiling system comprising: a support structure; at least one building panel coupled to the support structure, the building panel comprising a first major surface opposite a second major surface and a side surface extending between the first and second major surfaces, each of the building panel comprising: a core comprising: a first body comprising a first fibrous material; and a second body comprising a second fibrous material; a veneer facing layer coupled to the core; wherein the building panel is positioned vertically within the ceiling system.

Other embodiments of the present invention include a method of forming a building panel comprising: a) contacting a first porous body and a second porous body to form a first interface, whereby a first adhesive is present in the first interface, the first porous body, the second porous body, and the first adhesive form a core; b) contacting a veneer facing layer to a major surface of the core to form a second interface, whereby a second adhesive is present in the second interface to form the building panel; wherein the veneer facing layer comprises a plurality of perforations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
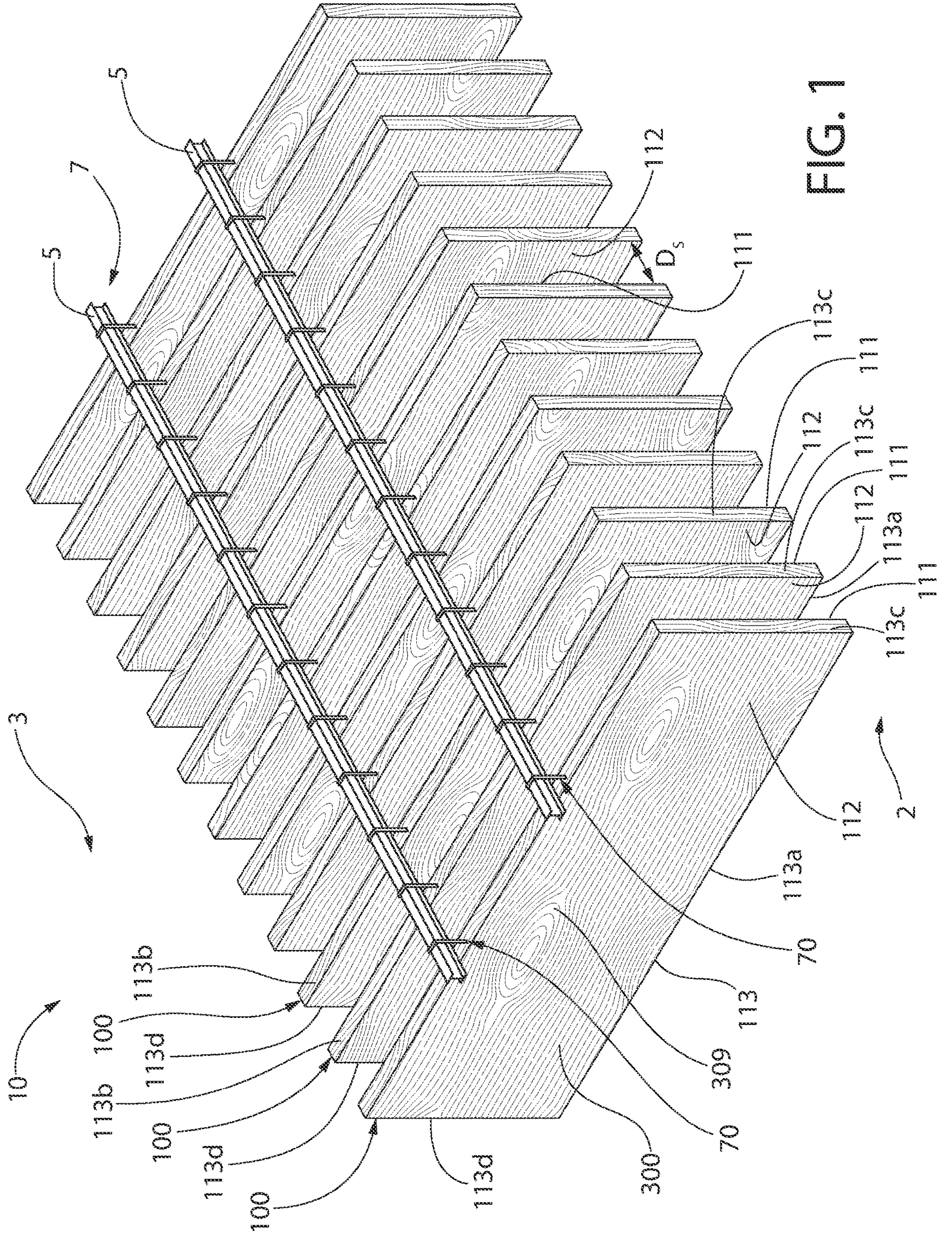
FIG. 1 is a perspective view of a ceiling system according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 3:
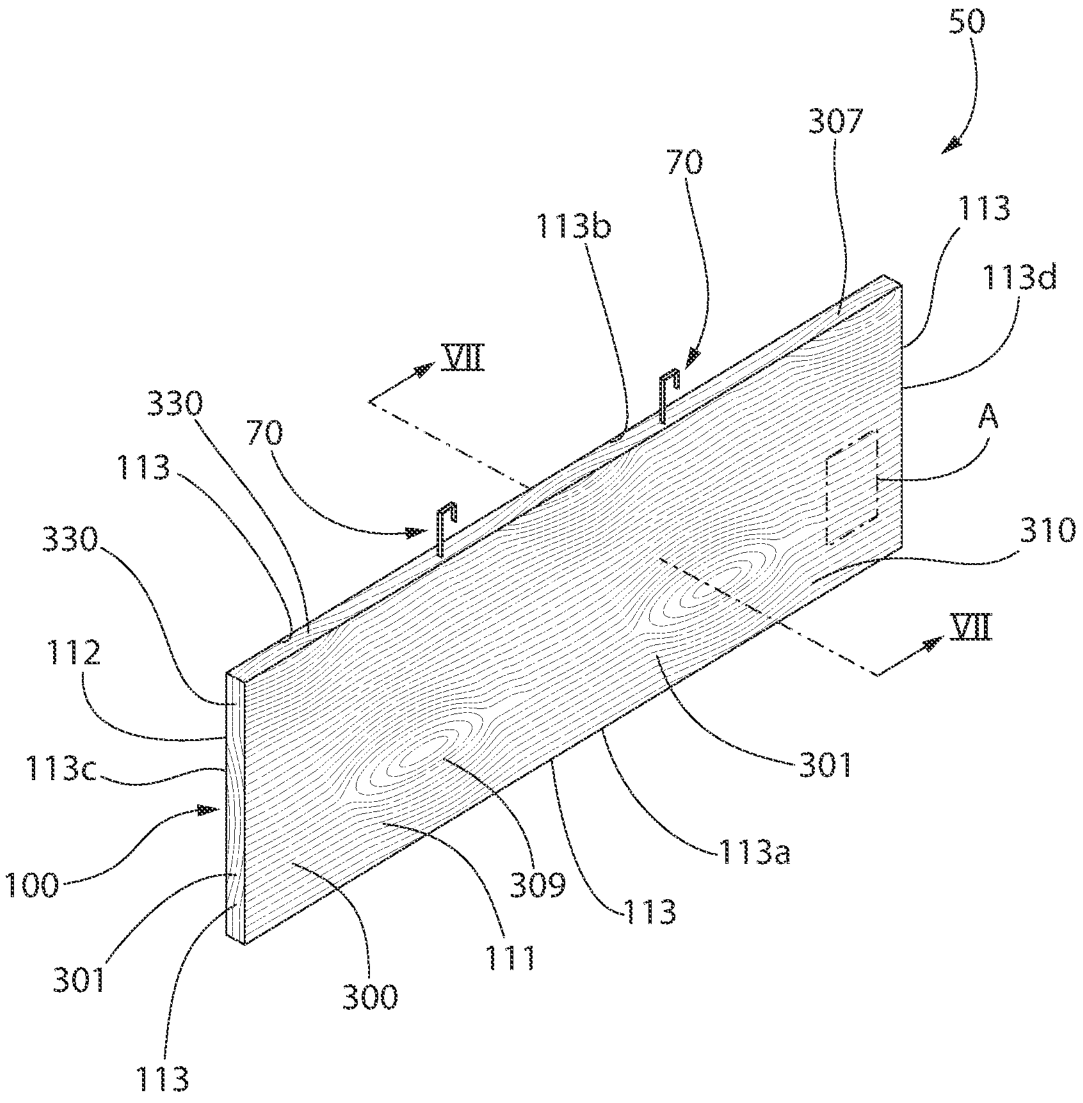
FIG. 3 is a perspective view of a building panel assembly according to the present invention, the building panel forming part of the ceiling system of FIGS. 1 and 2.

Referring to FIG. 3, the present invention includes a building panel assembly 50 comprising a building panel 100 and panel attachment hardware 70. In some embodiments, the building attachment hardware 70 may be separate hardware from the building panel 100. In other embodiments, the building attachment hardware 70 may be integrally formed with the building panel 100. The building panel 100 may be suitable as a ceiling panel. Therefore, the building panel 100 of the present invention may be referred to as a ceiling panel 100—although the building panel 100 is not limited to ceiling panels.

Figure 2:
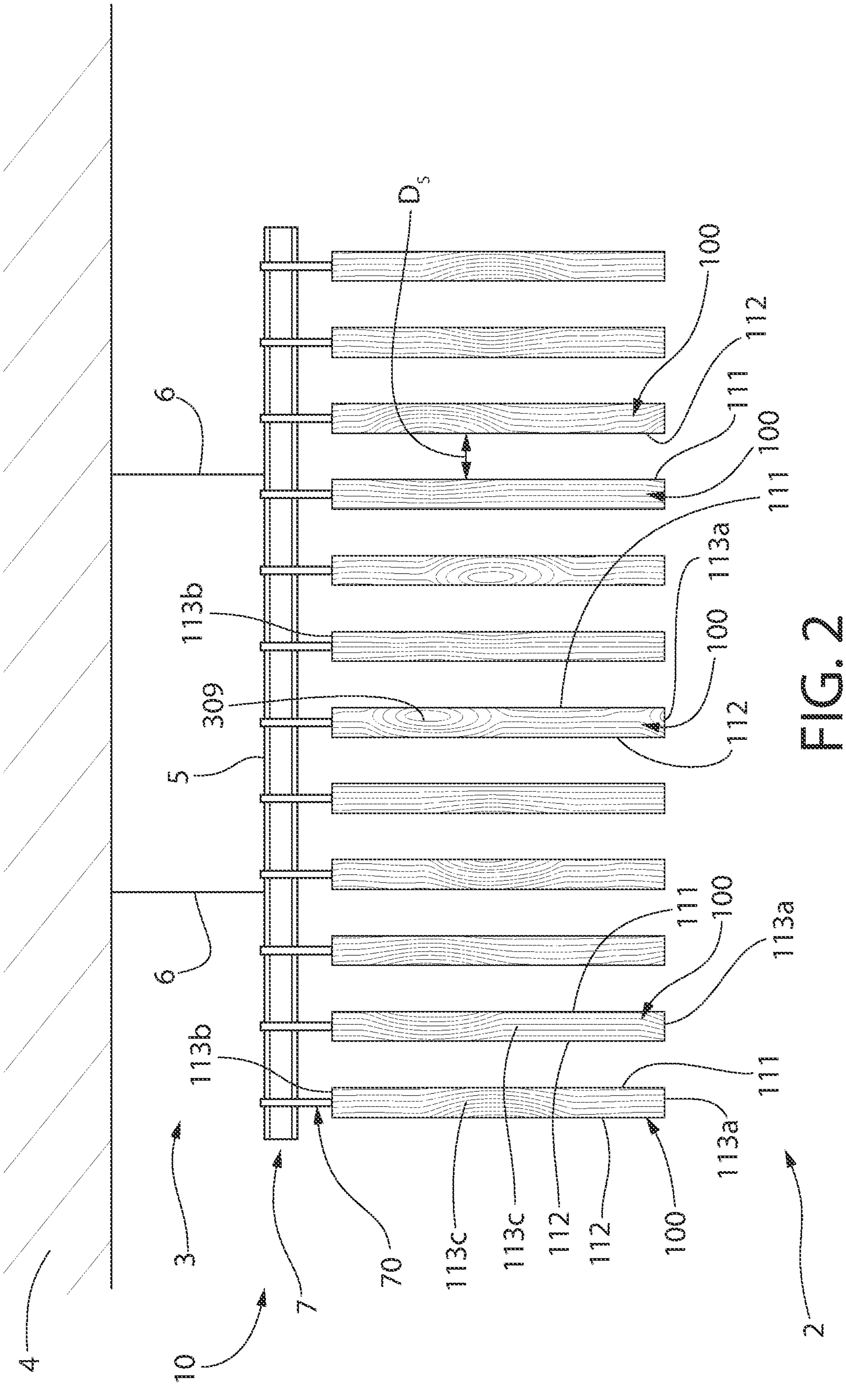
FIG. 2 is an elevational view of the ceiling system of FIG. 1 installed into a room environment.

Referring now to FIGS. 1 and 2, the present invention may further include a ceiling system 10 comprising one or more of the building panels 100 installed in an interior space, whereby the building panels 100 are attached to a support structure 7 via the panel attachment hardware 70. The interior space may comprise a plenary space 3 and an active room environment 2.

The plenary space 3 may be defined as the space existing between a structural barrier 4 and the support structure 7. The structural barrier may define the boundary of the interior space. A non-limiting example of a structural barrier may be a construction that separates two vertical floors of a building or house—e.g., a layer of poured concrete. The plenary space 3 provides space for mechanical lines within a building (e.g., HVAC, plumbing, etc.). The active space 2 may provide room for the building occupants during normal intended use of the building (e.g., in an office building, the active space would be occupied by offices containing computers, lamps, etc.). The plenary space 3 may exist above the support structure 7 and the active room environment 2 exists below the support structure 7.

The support structure 7 may comprise one or more parallel struts 5. The support structure 7 may be installed into the interior space by attaching strut attachment hardware 6 directly or indirectly to both the struts 5 and the structural barrier 4. In the installed state, the ceiling system 10 may comprise the building panels 100 being supported by the struts 5 of the support structure 7 in the interior space by the panel attachment hardware 70.

In a non-limiting example, the support struts 5 may comprise an inverted T-bar having a lower horizontal flange and a vertical web. In other embodiments, the support struts 5 may comprise an I-bar having a lower horizontal flange and an upper horizontal flange separated by a vertical web.

Although not pictured, in some embodiments, the ceiling system 10 may further comprise a plurality of first struts that are substantially parallel to each other and a plurality of second struts that are substantially perpendicular to the first struts. In some embodiments, the plurality of second struts intersects the plurality of first struts to create an intersecting ceiling support grid.

Figure 4:
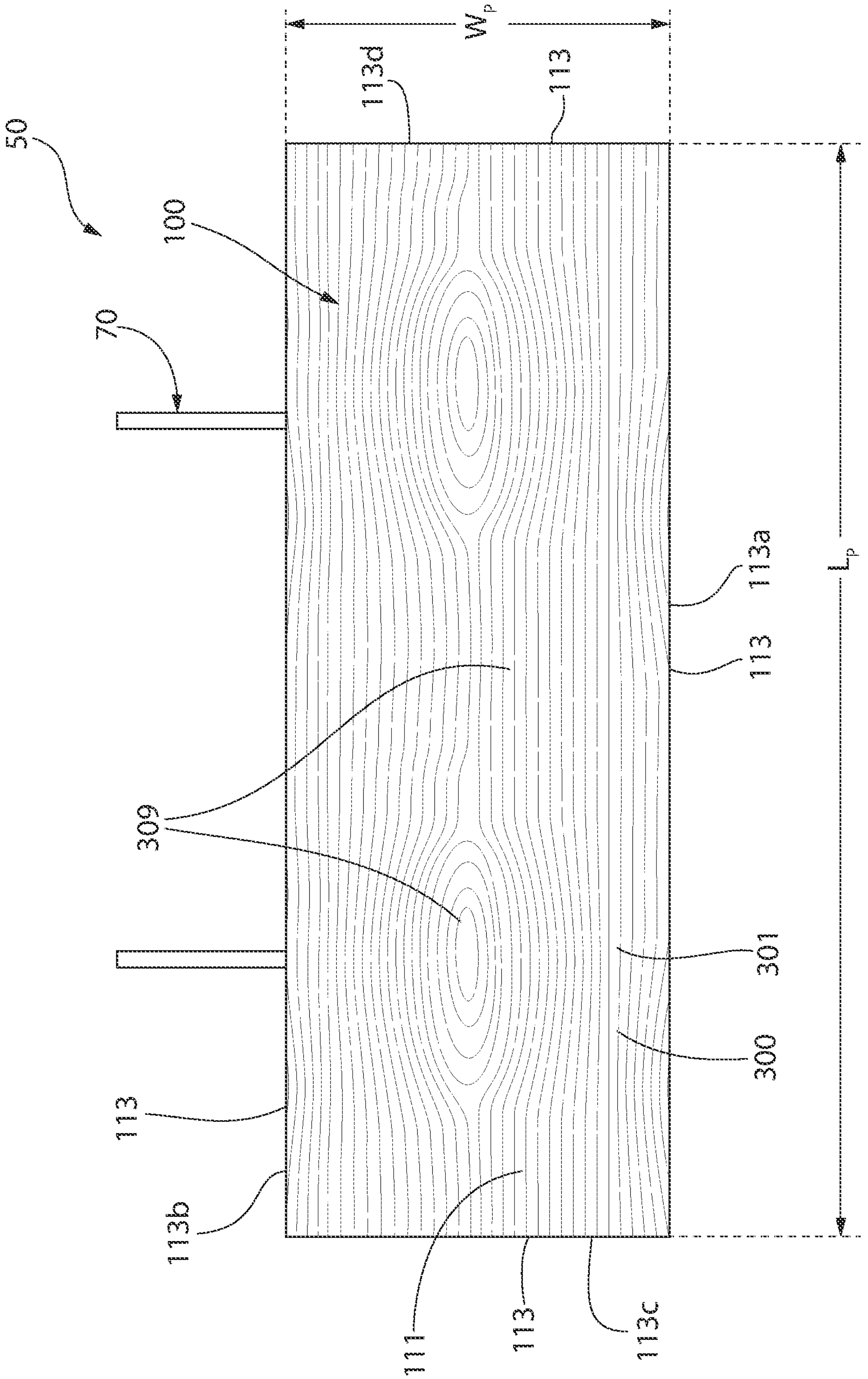
FIG. 4 is a side view of the building panel assembly of FIG. 3.
Figure 5:
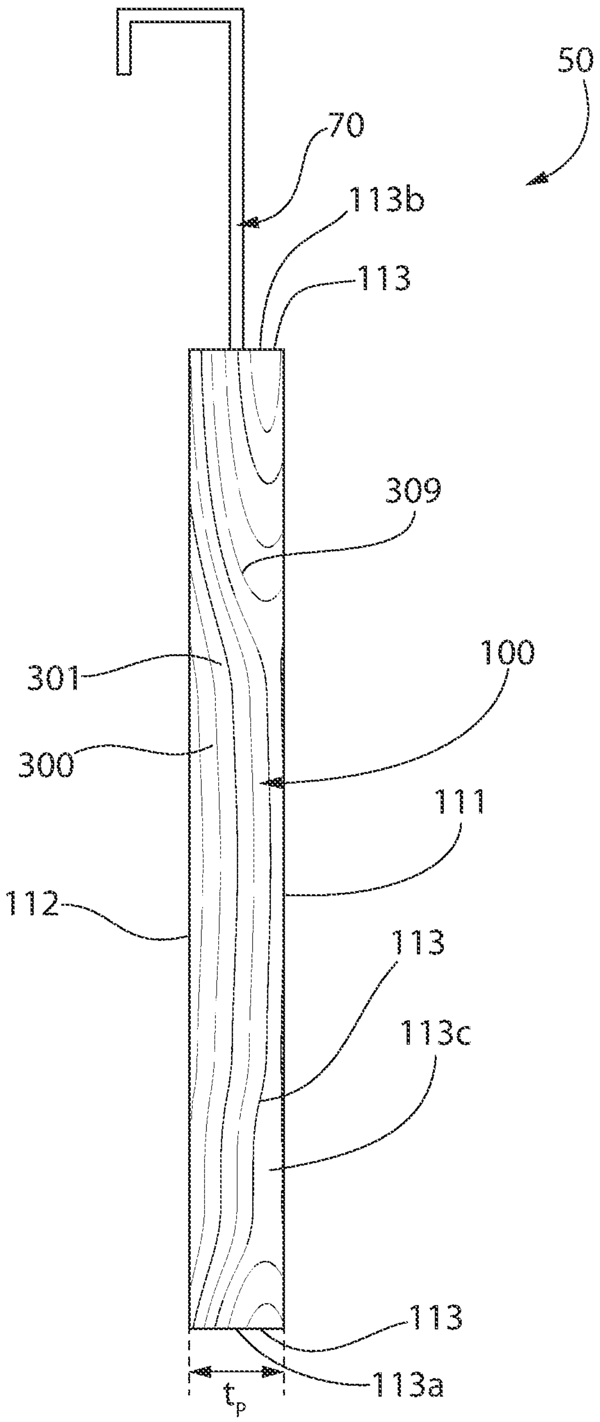
FIG. 5 is a front view of a building panel assembly according to another embodiment of the present invention.

Referring now to FIGS. 3-5, the building panel 100 of the present invention may comprise a first major exposed surface 111 opposite a second major exposed surface 112. The building panel 100 may further comprise a side exposed surface 113 that extends between the first major exposed surface 111 and the second major exposed surface 112, thereby defining a perimeter of the building panel 100.

The building panel 100 of the perimeter of the building panel 100 may be a variety of shapes—including polygonal, non-polygonal, curved, circular, and ovular. In a non-limiting embodiment, the perimeter of the building panel 100 may have four sides forming a rectangular shape—including both square and non-square rectangles. In a non-limiting embodiment, the perimeter of the building panel 100 may have four sides forming a trapezoidal shape. In a non-limiting embodiment, the perimeter of the building panel 100 may have four sides forming a parallelogram shape. In other embodiments, the perimeter of the building panel 100 may have five, six, seven, eight, or nine sides.

According to the embodiments where the building panel 100 comprises a perimeter with four sides, the side exposed surface 113 may comprise a first side exposed surface 113*a* opposite a second side exposed surface 113*b* as well as a third side exposed surface 113*c* opposite a fourth side exposed surface 113*d*. The first and second side exposed surfaces 113*a*, 113*b* may intersect the third and fourth side exposed surfaces 113*c*, 113*d*. A right angle may be formed between the first and second side exposed surfaces 113*a*, 113*b* and the respective intersecting third and fourth side exposed surfaces 113*c*, 113*d*. In other examples, an oblique angle may be formed between the first and second side exposed surfaces 113*a*, 113*b* and the respective intersecting third and fourth side exposed surfaces 113*c*, 113*d*.

The building panel 100 may have a length $L_P$ as measured by the distance between the third and fourth side exposed surfaces 113*c*, 113*d*. The building panel 100 may have a width $W_P$ as measured by the distance between the first and second side exposed surfaces 113*a*, 113*b*. The building panel 100 may have a thickness $t_P$ as measured by the distance between the first major exposed surface 111 and the second major exposed surface 112.

The length $L_P$ of the building panel 100 may be greater than the width $W_P$ of the building panel 100. In other embodiments, the length $L_P$ of the building panel 100 may be substantially equal to the width $W_P$ of the building panel 100. In other embodiments, the length $L_P$ of the building panel 100 may be less than the width $W_P$ of the building panel 100.

The length $L_P$ of the building panel 100 may range from about 30 cm to about 305 cm—including all lengths and sub-ranges there-between. In a preferred embodiment, the length $L_P$ of the building panel 100 may range from about 61 cm to about 244 cm—including all lengths and sub-ranges there-between. In some embodiments, the length $L_P$ of the building panel 100 may be about 122 cm inches. In some embodiments, the length $L_P$ of the building panel 100 may be about 183 cm. In some embodiments, the length $L_P$ of the building panel 100 may be about 239 cm.

The width $W_P$ of the building panel 100 may range from about 10 cm to about 91 cm—including all lengths and sub-ranges there-between. In a preferred embodiment, the width $W_P$ of the building panel 100 may range from about 13 cm to about 71 cm—including all lengths and sub-ranges there-between. In some embodiments, the width $W_P$ of the building panel 100 may be about 19 cm, about 25.4 cm, about 26.7 cm, about 40.6 cm, about 49.5 cm, about 55.9 cm, about 57.2 cm, or about 71.1 cm.

The thickness $t_P$ of the building panel 100 may range from about 12 mm to about 102 mm—including all lengths and sub-ranges there-between. In a preferred embodiment, the thickness $t_P$ of the building panel 100 may range from about 25 mm to about 76 mm—including all lengths and sub-ranges there-between. In some embodiments, the thickness $t_P$ of the building panel 100 may be about 51 mm. A ratio of the building panel 100 length $L_P$ to width $W_P$ may range from about 1.5:1 to about 30:1—including all ratios and sub-ranges there-between. In a preferred embodiment, the ratio of the building panel 100 length $L_P$ to width $W_P$ may range from about 1.5:1 to about 25:1—including all ratios and sub-ranges there-between.

As demonstrated by FIGS. 1 and 2, the building panels 100 of the present invention may be installed in a vertical orientation. In such installed state, the first side exposed surface 113*a* may face the active room environment 2 and the second side exposed surface 113*b* of the building panel 100 may face the plenary space 3. In such installed state, the first side exposed surface 113*a* and the second side exposed surface 113*b* of the building panel 100 may both be present in the active room environment 2. In such installed state, the third side exposed surface 113*c* and the fourth side exposed surface 113*d* of the building panel 100 may both be present in the active room environment 2. The first major exposed surface 111 of the building panels 100 may be substantially parallel to a vertical wall surface defining the room environment 2. The second major exposed surface 112 of the building panels 100 may be substantially parallel to a vertical wall surface defining the room environment 2.

Although not shown, the building panels 100 of the present invention may be installed in a horizontal orientation. In such installed state, the first major exposed surface 111 of the building panels 100 may face the active room environment 2 and the second major exposed surface 112 may face the plenary space 3. In the horizontal orientation, each of the first side exposed surface 113*a*, the second side exposed surface 113*b*, the third side exposed surface 113*c*, and the fourth side exposed surface 113*d* may independently be substantially parallel to the vertical wall surface that defines the room environment 2. In such installed state, the first major exposed surface 111 and the second major exposed surface 112 may be present in the active room environment 2.

Although not shown, the building panels 100 of the present invention may be installed in an oblique orientation—whereby at least one of the building panels are oriented at an oblique angle related to support structure 7. In such embodiments, at least one of the first major exposed surface 111 and/or the second major exposed surface 112 may be oriented at an angle ranging from about 1° to about 89° relative to the support structure 7. In such embodiments, at least one of the first major exposed surface 111 and/or the second major exposed surface 112 may be oriented at an angle ranging from about 1° to about 89° relative to the vertical wall surface defining the room environment.

The plenary space 3 may be an open plenary space—i.e., exposed to the active room environment 2. In other embodiments, the plenary space 3 may be a closed plenary space 3—i.e., concealed from the active room environment 2.

In the installed state, a plurality of building panels 100 may be installed such that a first major exposed surface 111 of a first building panel 100 faces a second major exposed surface 112 of a second building panel 100. In such installed state, the first major exposed surface 11 and the second major exposed surface 112 of the building panel 100 may both be present in the active room environment 2.

In the installed state, each of the plurality of building panels may be horizontally offset by a lateral offset distance Ds that is a positive non-zero value. Specifically, the later offset distance Ds may be the distance between the first major surface 111 of a first building panel 100 and the second major surface 112 of an adjacent-most second building panel 100. The lateral offset distance Ds may range from about 10 cm to about 244 cm—including all distances and sub-ranges there-between.

In the installed state, each of the plurality of building panels may be horizontally offset by a longitudinal offset distance that is a positive non-zero value. Specifically, the longitudinal offset distance may be the distance between the third side exposed surface 113*c* of a first building panel 100 and the fourth side exposed surface 113*d* of an adjacent-most second building panel 100. The longitudinal offset distance may range from about 2.5 cm to about 244 cm—including all distances and sub-ranges there-between. The ceiling system may comprise a single building panel 100.

The panel attachment hardware 70 may be coupled to the second side exposed surface 113*b* of the building panel 100. In other embodiments, the panel attachment hardware 70 may be coupled to either the first and/or second major exposed surfaces 111, 112 of the building panel at a location immediately adjacent to the second side exposed surface 113*b* of the building panel 100.

The building panels 100 of the present invention have superior dimensional stability without sacrificing weight concerns or the desired airflow properties required for the building panels 100 to functional as acoustical building panels—as discussed further herein.

Figure 6:
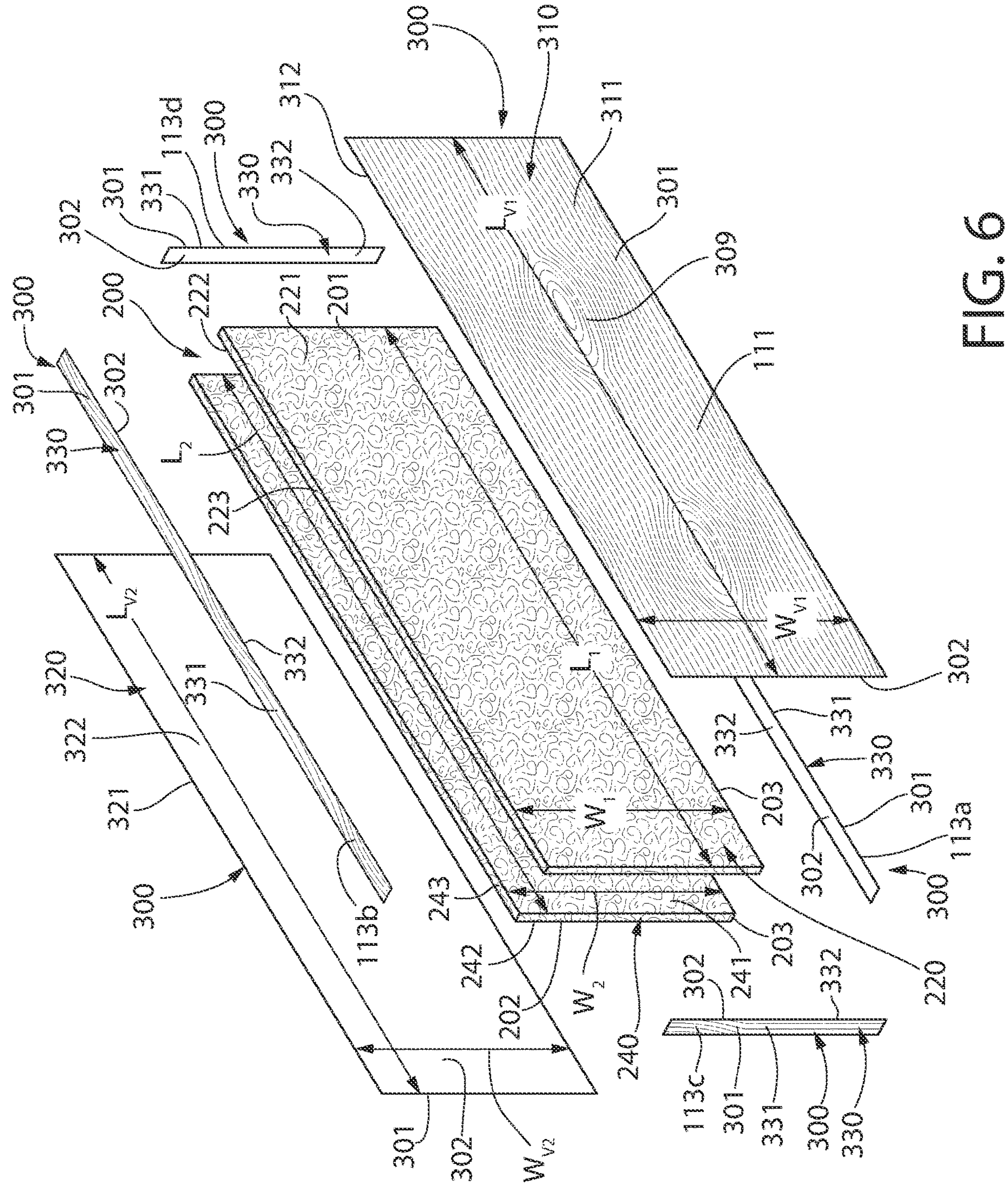
FIG. 6 is an exploded view of a building panel according to the present invention.
Figure 7:
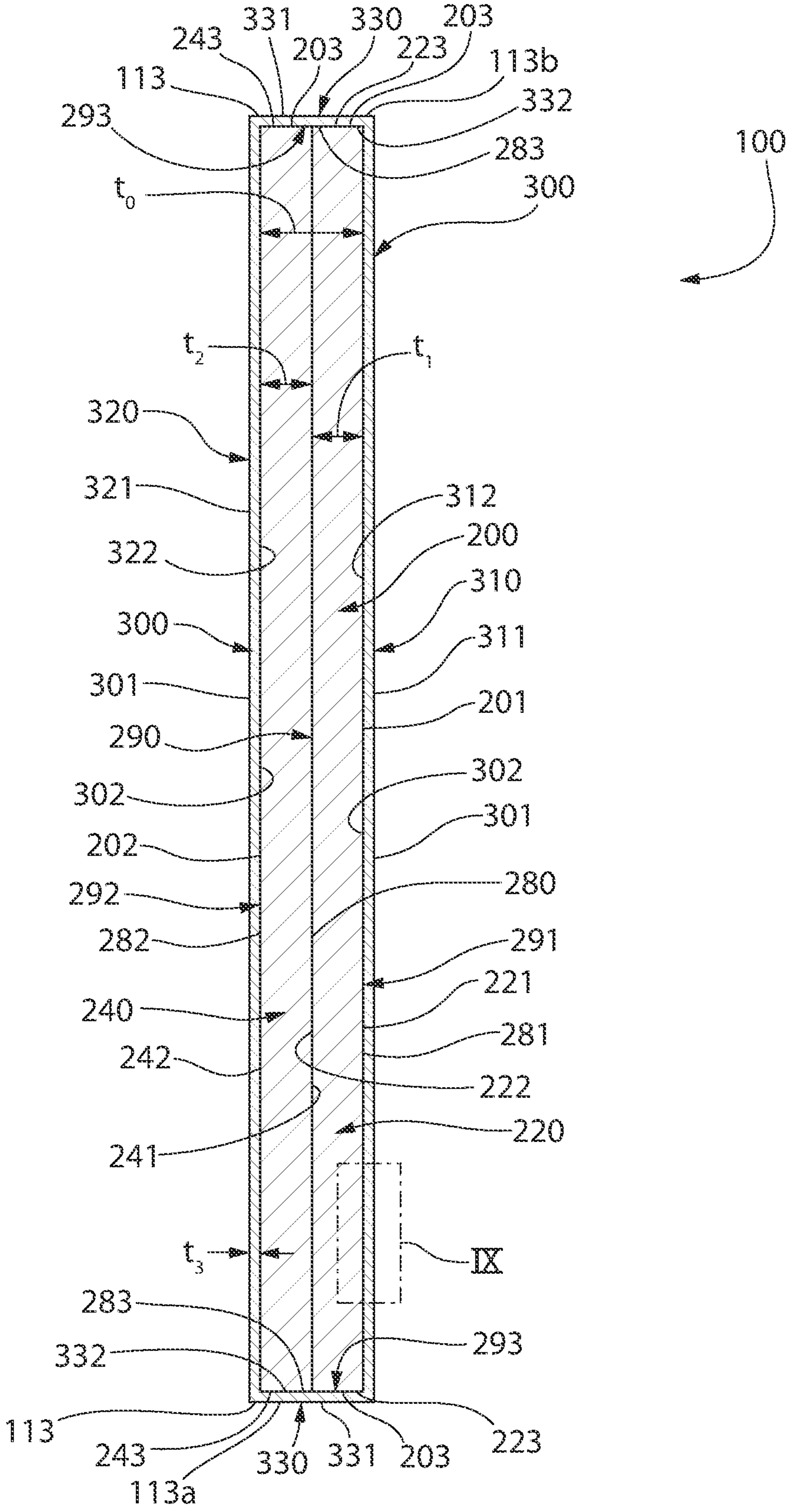
FIG. 7 is a cross-sectional view of the building panel along ling VII-VII of FIG. 3.
Figure 8:
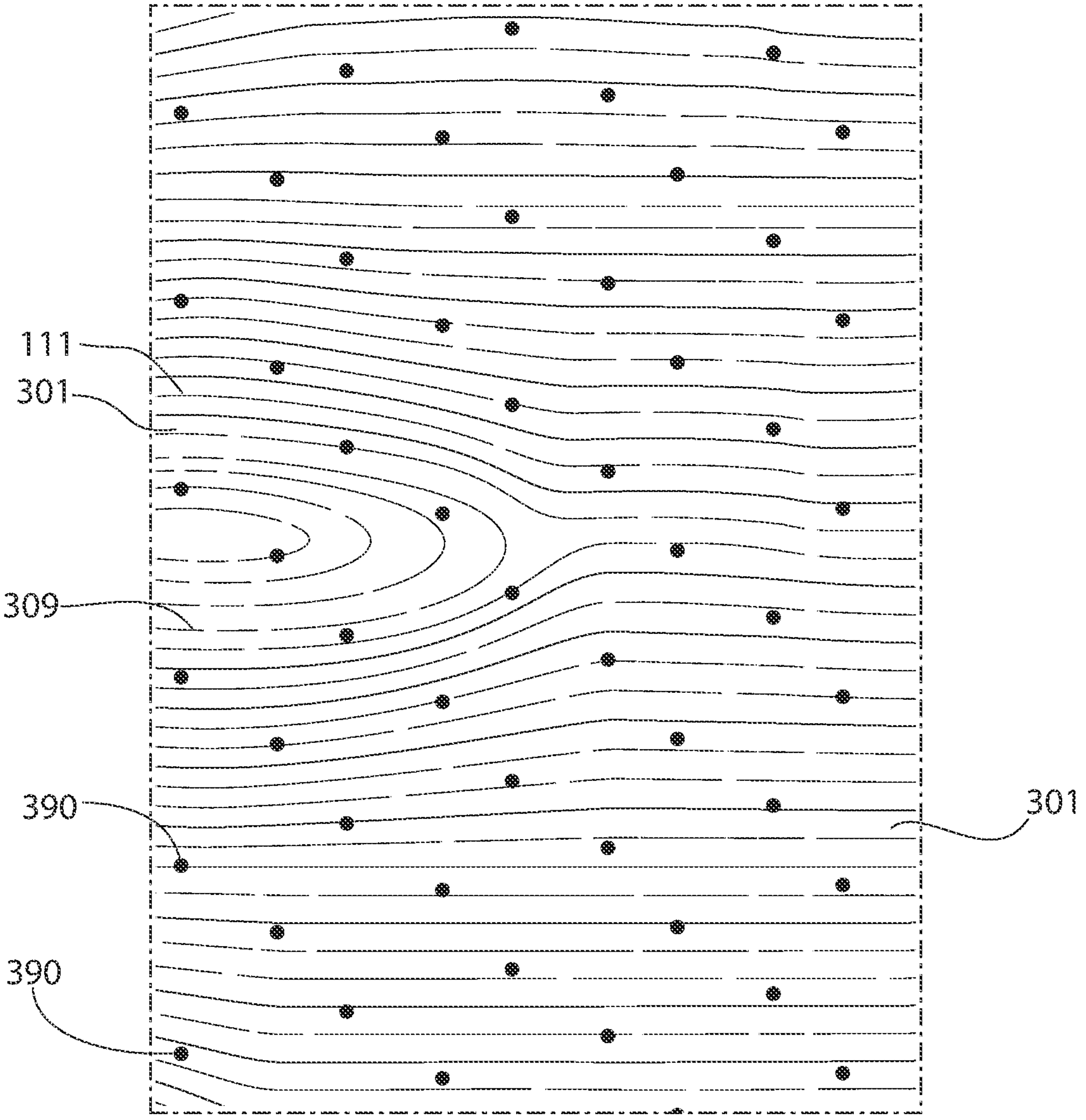
FIG. 8 is a close-up view of region A in FIG. 3.
Figure 9:
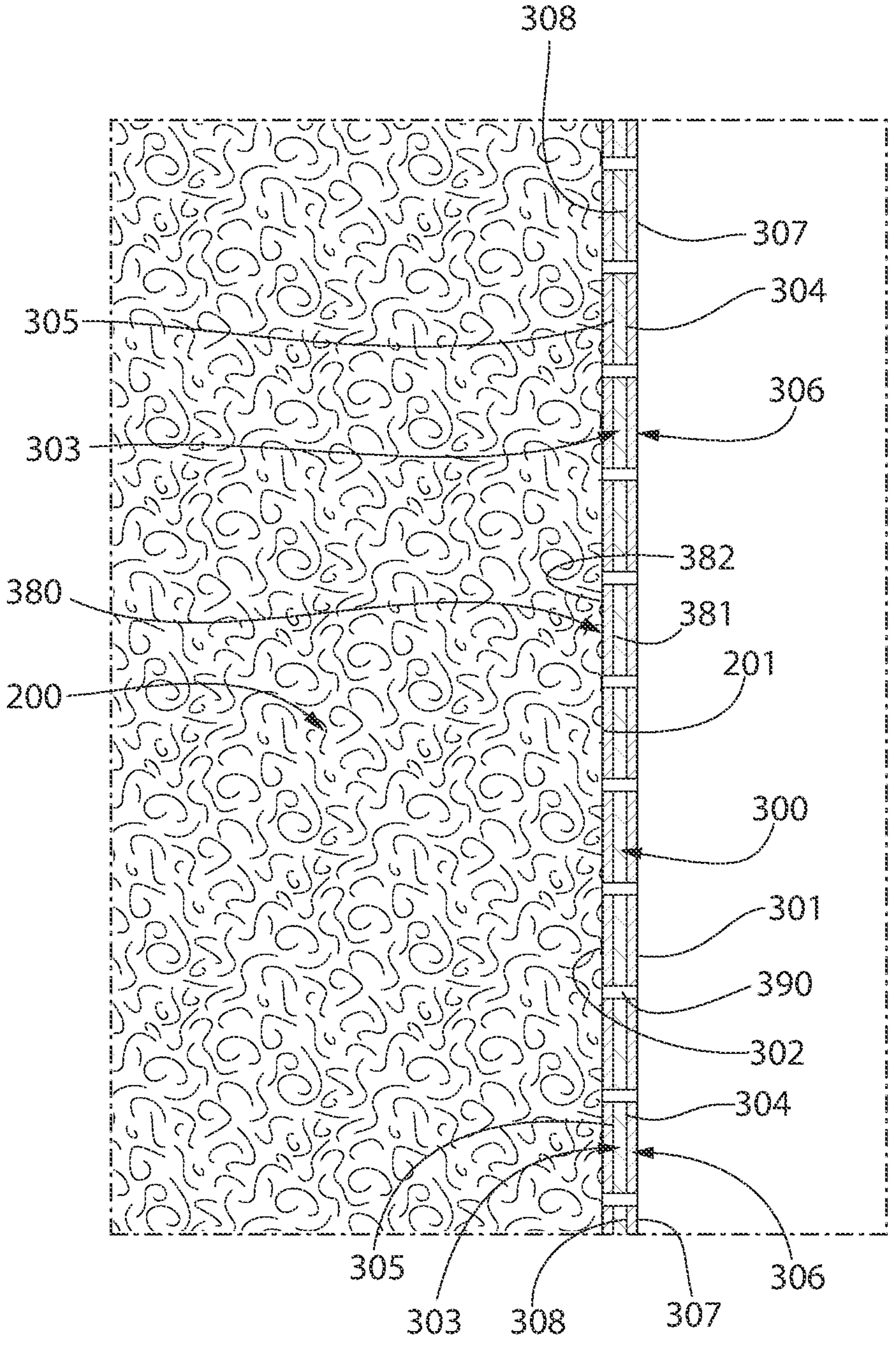
FIG. 9 is a close-up view of region IX in FIG. 7.

Referring now to FIGS. 6 and 7, each of the building panels 100 of the present invention may comprise a core 200 and a veneer facing layer 300. As described in greater detail herein, the veneer facing layer 300 may be coupled to the core 200 by one or more of adhesive, fastener, or the like. In a preferred embodiment, the veneer facing layer 300 may be adhesively bonded to the core 200.

The core 200 may comprise a first major surface 201 opposite a second major surface 202 and a side surface extending between the first and second major surfaces 201, 202. The core 200 may comprise a core thickness to as measured by the distance between the first and second major surfaces 201, 202 of the core 200. The core thickness to may range from about 6 mm to about 76 mm—including all thicknesses and sub-ranges there-between. The core 200 may have a core length $L_0$ and a core width $W_0$—as discussed in greater detail herein. The core 200 may comprise a first body 220 and a second body 240.

The first body 220 may comprise a first major surface 221 opposite a second major surface 222 and a side surface 223 extending between the first and second major surfaces 221, 222. The first body 220 may have a first length $L_1$ and a first width $W_1$—as discussed in greater detail herein. The first body 220 may have a first thickness $t_1$—as measured by the distance between the first major surface 221 and the second major surface 222 of the first body 220. The first thickness $t_1$ may range from about 3.1 mm to about 73 mm—including all thicknesses and sub-ranges there-between.

The first body 220 may be porous. The term "porous" as used herein refers to the first body 220 allowing airflow into and through the first body 220 and between the first major surface 221 and the second major surface 222 of the first body 220 under atmospheric conditions. Additionally, the term "porous" as used herein may refer to the first body 220 allowing airflow into the first body 220 from the side surface 223 under atmospheric conditions.

The second body 240 may comprise a first major surface 241 opposite a second major surface 242 and a side surface 243 extending between the first and second major surfaces 241, 242. The second body 240 may have a second length $L_2$ and a second width $W_2$—as discussed in greater detail herein. The second body 240 may have a second thickness $t_2$—as measured by the distance between the first major surface 241 and the second major surface 242 of the second body 240. The second thickness $t_2$ may range from about 3.1 mm to about 73 mm—including all thicknesses and sub-ranges there-between.

The second body 240 may also be porous. Therefore, the term "porous" as used herein also refers to the second body 240 allowing airflow into and through the second body 240 and between the first major surface 241 and the second major surface 242 of the second body 240 under atmospheric conditions. Additionally, the term "porous" as used herein may refer to the second body 240 allowing airflow into the second body 240 from the side surface 243 under atmospheric conditions.

The first body 220 may be comprised of a first fibrous material. The first body 220 may further comprise a first binder. In some embodiments, the first body 220 may further comprise a filler and/or additive.

The first body 220 may have a porosity ranging from about 50% to about 97%—including all values and sub-ranges there between. In a preferred embodiment, the first body 220 has a porosity ranging from about 65% to about 97%—including all values and sub-ranges there between. According to the present invention, porosity refers to the following:

$$\% \text{ Porosity}=[V_{Total}-(W_{Binder}+V_F+V_A+V_{Filler})]/V_{Total}$$

Where $V_{Total}$ refers to the total volume of the first body 220 defined by the first major surface 221, the second major surface 222, and the side surfaces 223. $V_{Binder}$ refers to the total volume occupied by the first binder in the first body 220. $V_F$ refers to the total volume occupied by the first fibrous material in the first body 220. $V_{Filler}$ refers to the total volume occupied by the filler in the first body 220. $V_A$ refers to the total volume occupied by any additive present in the first body 220. Thus, the % porosity represents the amount of free volume within the first body 220.

The porous nature of the first body 220 may allow for airflow into the first body 220, thereby imparting a sound-reducing property to the first body 220 that helps reduce the amount of reflected sound in a surrounding room environment room. The reduction in amount of reflected sound in a room is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The first body 220 may exhibit an NRC of at least about 0.30. The first body 220 may exhibit an NRC ranging from about 0.50 to about 1.2—including all value and sub-ranges there-between. In a non-limiting embodiment, the first body 220 may comprise mineral wool and have an NRC value ranging from 0.5 to 0.99. In a non-limiting embodiment, the first body 220 may comprise fiberglass and have an NRC value up to 1.1. In a non-limiting embodiment, the first body 220 may comprise fiberglass and have an NRC value up to 1.2.

The second body 240 may be comprised of a second fibrous material. The second body 240 may further comprise a second binder. In some embodiments, the second body 240 may further comprise a filler and/or additive.

The second body 240 may have a porosity ranging from about 50% to about 97%—including all values and sub-ranges there between. In a preferred embodiment, the body 120 has a porosity ranging from about 65% to about 97%—including all values and sub-ranges there between. The porosity of the second body 240 may be calculated according to the previously set forth methodology as discussed with respect to the first body 220, except that $V_{Total}$ refers to the total volume of the second body 240 defined by the first major surface 241, the second major surface 242, and the side surfaces 243 of the second body 240. $V_{Binder}$ refers to the total volume occupied by the first binder in the second body 240. $V_F$ refers to the total volume occupied by the second fibrous material in the second body 240. $V_{Filler}$ refers to the total volume occupied by the filler in the second body 240. $V_A$ refers to the total volume occupied by any additive present in the second body 240. Thus, the % porosity represents the amount of free volume within the second body 240.

The second body 240 may exhibit an NRC of at least about 0.30. The second body 240 may exhibit an NRC ranging from about 0.50 to about 1.2—including all value and sub-ranges there-between. In a non-limiting embodiment, the second body 240 may comprise mineral wool and have an NRC value ranging from 0.50 to 0.99. In a non-limiting embodiment, the second body 240 may comprise fiberglass and have an NRC value up to 1.1. In a non-limiting embodiment, the second body 240 may comprise fiberglass and have an NRC value up to 1.2.

Each of the first fibrous material and the second fibrous material may be independently selected from organic fibers, inorganic fibers, or a blend thereof. In a preferred embodiment, at least one of the first fibrous material and the second fibrous material is inorganic fibers. Non-limiting examples of inorganic fiber include mineral wool (also referred to as slag wool), rock wool, stone wool, and fiberglass. Non-limiting examples of organic fiber include cellulosic fibers (e.g. paper fiber—such as newspaper, hemp fiber, jute fiber, flax fiber, wood fiber, or other natural fibers), felt fibers, polymer fibers (including polyester, polyethylene, aramid—i.e., aromatic polyamide, and/or polypropylene), protein fibers (e.g., sheep wool), and combinations thereof.

The first fibrous material may be present in an amount ranging from about 5 wt. % to about 99 wt. % based on the total dry weight of the first body 220—including all values and sub-ranges there-between. The second fibrous material may be present in an amount ranging from about 5 wt. % to about 99 wt. % based on the total dry weight of the second body 240—including all values and sub-ranges there-between.

The phrase "dry-weight" refers to the weight of a referenced component without the weight of any carrier. Thus, when calculating the weight percentages of components in the dry-state, the calculation should be based solely on the solid components (e.g., binder, filler, hydrophobic component, fibers, etc.) and should exclude any amount of residual carrier (e.g., water, VOC solvent) that may still be present from a wet-state, which will be discussed further herein. According to the present invention, the phrase "dry-state" may also be used to indicate a component that is substantially free of a carrier, as compared to the term "wet-state," which refers to that component still containing various amounts of carrier—as discussed further herein.

Each of the first binder and second binder may be independently selected from a polyurethane binder, polyester binder, epoxy based binder (i.e., cured epoxy resin), polyvinyl alcohol (PVOH), a latex, phenolic resin, and a combination of two or more thereof. The first binder may be present in the first body 220 in an amount ranging from about 1 wt. % to about 25 wt. % based on the total dry weight of the first body 220—including all values and sub-ranges there-between. The second binder may be present in the second body 240 in an amount ranging from about 1 wt. % to about 25 wt. % based on the total dry weight of the second body 240—including all values and sub-ranges there-between.

Each of the first body 220 and second body 240 may independently comprise filler. Non-limiting examples of filler may include powders of calcium carbonate, including limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

The filler may be present in an amount ranging from about 2.5 wt. % to about 99 wt. % based on the total dry weight of the first body 220—including all values and sub-ranges there-between. The filler may be present in an amount ranging from about 2.5 wt. % to about 99 wt. % based on the total dry weight of the second body 240—including all values and sub-ranges there-between.

In a separate embodiment, the filler may be present in an amount ranging from about 5 wt. % to about 99 wt. % based on the total dry weight of the first body 220—including all values and sub-ranges there-between. In a separate embodiment, the filler may be present in an amount ranging from about 5 wt. % to about 99 wt. % based on the total dry weight of the second body 240—including all values and sub-ranges there-between.

In some embodiments, the filler may be present in an amount ranging from about 10 wt. % to about 99 wt. % based on the total dry weight of the first body 220—including all values and sub-ranges there-between. In some embodiments, the filler may be present in an amount ranging from about 10 wt. % to about 99 wt. % based on the total dry weight of the second body 240—including all values and sub-ranges there-between.

In some embodiments, the filler may be present in an amount ranging from about 25 wt. % to about 99 wt. % based on the total dry weight of the first body 220—including all values and sub-ranges there-between. In some embodiments, the filler may be present in an amount ranging from about 25 wt. % to about 99 wt. % based on the total dry weight of the second body 240—including all values and sub-ranges there-between.

The first body 220 may have a first bulk density. The first bulk density may range from about 40 $kg/m^3$ to about 385 $kg/m^3$—including all densities and sub-ranges there-between. In some embodiments, the first bulk density may range from about 64 $kg/m^3$ to about 385 $kg/m^3$—including all densities and sub-ranges there-between. The first bulk density may range from about 96 $kg/m^3$ to about 385 $kg/m^3$—including all densities and sub-ranges there-between. In some embodiments, the first body 220 may have a first bulk density ranging from about 96 $kg/m^3$ to about 160 $kg/m^3$—including all densities and sub-ranges there-between. According to these embodiments, the first body 220 may be formed from polyester.

In some embodiments, the first body 220 may have a first bulk density ranging from about 40 $kg/m^3$ to about 208 $kg/m^3$—preferably about 64 $kg/m^3$ to about 208 $kg/m^3$—including all densities and sub-ranges there-between. According to these embodiments, the first body 220 may be formed from fiberglass. In some embodiments, the first body 220 may have a first bulk density ranging from about 192 $kg/m^3$ to about 384 $kg/m^3$—including all densities and sub-ranges there-between. According to these embodiments, the first body 220 may be formed from mineral wool.

The second body 240 may have a second bulk density. The second bulk density may range from about 40 $kg/m^3$ to about 385 $kg/m^3$—including all densities and sub-ranges there-between. In some embodiments, the second bulk density may range from about 64 $kg/m^3$ to about 384 $kg/m^3$—including all densities and sub-ranges there-between. The second bulk density may range from about 96 $kg/m^3$ to about 385 $kg/m^3$—including all densities and sub-ranges there-between. In some embodiments, the second body 240 may have a second bulk density ranging from about 96 $kg/m^3$ to about 160 $kg/m^3$—including all densities and sub-ranges there-between. According to these embodiments, the second body 220 may be formed from polyester.

In some embodiments, the second body 240 may have a second bulk density ranging from about 40 $kg/m^3$ to about 208 $kg/m^3$—preferably about 64 $kg/m^3$ to about 208 $kg/m^3$—including all densities and sub-ranges there-between. According to these embodiments, the second body 240 may be formed from fiberglass. In some embodiments, the second body 240 may have a second bulk density ranging from about 192 $kg/m^3$ to about 385 $kg/m^3$—including all densities and sub-ranges there-between. According to these embodiments, the second body 240 may be formed from mineral wool.

The first bulk density and the second bulk density may be equal. In other embodiments, the first bulk density and the second bulk density may be different. In some embodiments, the first bulk density may be greater than the second bulk density. In some embodiments, the first bulk density may be less than the second bulk density.

The core 200 may be formed by joining together the first body 220 and the second body 240. The first body 220 and the second body 240 may be joined together with a first adhesive 280.

The first body 220 and the second body 240 may be joined together such that a first interface 290 is formed there-between. Specifically, the first interface 290 may be located between the second major surface 222 of the first body 220 and the first major surface 241 of the second body 240. The first adhesive 280 may be present in the first interface 290, thereby bonding together the first body 220 and the second body 240.

The first adhesive 280 may be present in the first interface 290 an amount ranging from about 3.0 g/m$^2$ to about 500.0 g/m$^2$—based on the total dry weight of the first adhesive 280—including all amounts and sub-ranges there-between. In some embodiments, the first adhesive 280 may be present in the first interface 290 an amount ranging from about 5.0 g/m$^2$ to about 500 g/m$^2$—based on the total dry weight of the first adhesive 280—including all amounts and sub-ranges there-between. In a preferred embodiment, the first adhesive 280 may be present in the first interface 290 an amount ranging from about 20.0 g/m$^2$ to about 200.0 g/m$^2$—based on the total dry weight of the first adhesive 280—including all amounts and sub-ranges there-between.

The first adhesive 280 may comprise a polymer binder. Non-limiting examples of the polymer binder in the first adhesive 280 may include polyvinyl acetate, polyurethane, epoxy, acrylic, natural or synthetic rubber, silicone, and combinations thereof. The first adhesive 280 may be applied in a wet-state further comprising a liquid carrier. Non-limiting examples of liquid carrier include water and/or organic solvent. In other embodiments, the first adhesive 280 may be applied in a flowable form, whereby the composition comprises substantially no liquid carrier, but the polymer binder is present in a lower viscosity, uncured form—whereby after application, the polymer binder cures and hardens into a solid, dry-state first adhesive 280. In a non-limiting embodiment, the first adhesive 280 may be a hot-melt adhesive.

In forming the core 200, the first adhesive 280 may be applied in the wet-state directly to the second major surface 222 of the first body 220. In other embodiments, the core 200 may be formed by applying the first adhesive 280 directly to the first major surface 241 of the second body 220. In other embodiments, the first adhesive 280 may be applied directly to both the first major surface 241 of the second body 240 and the second major surface 222 of the first body 220. The first adhesive 280 may be applied continuously. In other embodiments, the first adhesive 280 may be applied discontinuously—for example, in streaks across at least one of the first major surface 241 of the second body and/or the second major surface 222 of the first body 220.

The first adhesive 280 may be applied by spray coating, roll coating, dip coat, curtain coating, and the like.

After application, the first adhesive 280 may be present on the first major surface 241 of the second body 240. After application, the first adhesive 280 may penetrate into the second body 240 from the first major surface 241 at a depth equal to about 1 mil to about 500 mils as measured from the first major surface 241 of the second body 240. After application, the first adhesive 280 may penetrate into the first body 220 from the second major surface 222 at a depth equal to about 1 mil to about 500 mils as measured from the second major surface 222 of the first body 220.

Once the first adhesive 280 is applied, the first major surface 241 of the second body 240 and the second major surface 222 of the first body 220 may be brought together, thereby forming the first interface 290 where the first adhesive 280 is present in the first interface 290. The first adhesive 280 may be applied in a wet-state and after the first and second body 220, 240 are brought together, the first adhesive 280 may dry and/or cure, thereby forming adhesively bonding the first body and the second body 240. The first adhesive 280 may be dried and/or cured in the first interface 290 at room temperature. In other embodiments, the first adhesive 280 in the first interface 290 may be dried and/or cured at an elevated temperature ranging from about 40° C. to about 300° C.—including all temperatures and sub-ranges there-between.

The core thickness to may be substantially equal to the sum of both the first thickness $t_1$ of the first body 220 and the second thickness $t_2$ of the second body 240. The core length $L_0$ may be substantially equal to the first length $L_1$ of the first body 220. The core length $L_0$ may be substantially equal to the second length $L_2$ of the second body 220.

The first interface 290—as defined by the volume between the first major surface 241 of the second body 240 and the second major surface 222 of the first body 220—may include only the first adhesive 280. Stated otherwise, the first interface 290 may be substantially free of any intermediate layers or intermediate components other than the first adhesive 280.

Referring now to FIGS. 6-9, the veneer facing layer 300 may be coupled to the core 200. The veneer facing layer 300 may comprise an outer surface 301 opposite an inner surface 302. The veneer facing layer 300 may have a veneer thickness $t_3$ as measured by the distance between the inner surface 302 and the outer surface 301. The first thickness $t_1$ of the first body 220 may be greater than the veneer thickness $t_3$. The second thickness $t_2$ of the second body 240 may be less than the veneer thickness $t_3$. The veneer thickness $t_3$ may range from about 5 mils to about 170 mils—including all thicknesses and sub-ranges there-between.

The veneer facing layer 300 may have a third bulk density. The third bulk density may range from about 0.09 g/cm$^3$ to about 1.81 g/cm$^3$—including all amounts and sub-ranges there-between.

In some embodiments, the veneer facing layer 300 may be a polymeric film and the third bulk density may range from about 0.09 g/cm$^3$ to about 0.14 g/cm$^3$—including all amounts and sub-ranges there-between.

In some embodiments, the veneer facing layer 300 may comprise a cellulosic substrate and a backing layer (as discussed in greater detail herein), such veneer facing layer 300 may have a third bulk density may range from about 0.48 g/cm$^3$ to about 0.72 g/cm$^3$—including all amounts and sub-ranges there-between.

In some embodiments, the veneer facing layer 300 may be formed entirely from cellulosic material (e.g., paper) and have a third bulk density may range from about 1.50 g/cm$^3$ to about 1.81 g/cm$^3$—including all amounts and sub-ranges there-between.

The third density may be equal to each of the first density and the second density. The third density may be different from the first density. The third density may be different from the second density. The third density may be greater than each of the first density and the second density.

The veneer facing layer 300 may further comprise a plurality of perforations 390 that extend between the inner surface 302 and the outer surface 301 of the veneer facing layer 300. The perforations 390 for an open pathway allowing airflow through the veneer facing layer 300 such that the veneer facing layer 300 may be air-permeable between the inner surface 302 and outer surface 301 under atmospheric conditions.

Each of the plurality of perforations may have an average diameter ranging from about 0.3 mm to about 8 mm—including all diameters and sub-ranges there-between. The plurality of perforations may be present on the veneer facing layer 300 in a frequency of about 0.01 perforations/cm$^2$ to about 30 perforations/cm$^2$—including all amounts and sub-ranges there-between. The plurality of perforations may occupy about 2% to about 10% of the surface area present on each of the first and second major exposed surfaces 111, 112 of the building panel 100.

In some embodiments, the plurality of perforations may have an average diameter ranging from about 5 mm to about 8 mm (herein referred to as "macroperforations"—including all diameters and sub-ranges there-between. The plurality of larger perforations may be present on the veneer facing layer 300 in a frequency of about 0.01 perforations/cm$^2$ to about 30 perforations/cm$^2$—including all amounts and sub-ranges there-between. The plurality of larger perforations may occupy about 2% to about 10% of the surface area present on each of the first and second major exposed surfaces 111, 112 of the building panel 100.

In some embodiments, the plurality of perforations may have an average diameter ranging from about 0.3 mm to about 2.0 mm (herein referring to as "microperforations")—including all diameters and sub-ranges there-between. The plurality of larger perforations may be present on the veneer facing layer 300 in a frequency of about 0.01 perforations/cm$^2$ to about 30 perforations/cm$^2$—including all amounts and sub-ranges there-between. The plurality of larger perforations may occupy about 3% to about 10% of the surface area present on each of the first and second major exposed surfaces 111, 112 of the building panel 100.

The veneer facing layer 300 may comprise a substrate 303 and an outer coating 306 applied thereto. The substrate 303 may comprise a first major surface 304 opposite a second major surface 305. The outer coating 306 may comprise an inner surface 308 opposite an outer surface 307. The veneer facing layer 300 may comprise a backing layer 380. The backing layer 380 may comprise a first major surface 381 opposite a second major surface 382.

Although not pictured, the second major surface 305 of the substrate 303 may form the inner surface 302 of the veneer facing layer 300. The outer surface 307 of the outer coating 306 may form the outer surface 301 of the veneer facing layer 300. Each of the perforations 390 may extend through both the substrate 303 and the outer coating 306.

In such embodiments, the second interface 291 may be formed between the second major surface 305 of the substrate 303 of the respective veneer facing layer 310 and the first major surface 201 of the core 200. In such embodiments, the third interface 292 may be formed between the second major surface 305 of the substrate 303 of the respective veneer facing layer 320 and the second major surface 202 of the core 200. In such embodiments, the fourth interface 293 may be formed between the second major surface 305 of the substrate 303 of the respective veneer facing layer 330 and the side surface 203 of the core 200.

In other embodiments, the second major surface 382 of the backing layer 380 may form the inner surface 302 of the veneer facing layer 300, whereby the first major surface 381 of the backing layer 380 is coupled to the second major surface 305 of the substrate 303. The outer surface 307 of the outer coating 306 may form the outer surface 301 of the veneer facing layer 300. Each of the perforations 390 may extend through each of the outer coating 306, the substrate 303, and the backing layer 380.

In such embodiments, the second interface 291 may be formed between the second major surface 382 of the backing layer 380 of the respective veneer facing layer 310 and the first major surface 201 of the core 200. In such embodiments, the third interface 292 may be formed between the second major surface 382 of the backing layer 380 of the respective veneer facing layer 320 and the second major surface 202 of the core 200. In such embodiments, the fourth interface 293 may be formed between the second major surface 382 of the backing layer 380 of the respective veneer facing layer 330 and the side surface 203 of the core 200.

The backing layer 380 may be formed of a cellulosic material, a polymeric material, a woven material, and combinations thereof. In some embodiments, the backing layer 380 may be a cellulosic material, such as a paper backing layer.

The panel attachment hardware 70 may be a hook member, wire, and combinations thereof. The panel attachment hardware 70 may be coupled directly to the veneer facing layer 300. In a non-limiting embodiment, the panel attachment hardware 70 may be coupled to the outer surface 301 of the veneer facing layer 300 by adhesive. In other embodiments, the panel attachment hardware may be coupled to the veneer facing layer 300 by a fastener that extends through the veneer facing layer 300. In some embodiments, the fastener may extend through the veneer facing layer 300 and into a portion of the core 200. The fastener may be a screw or bolt. The fastener may be drilled into the building panel 100.

In some embodiments, the panel attachment hardware 70 may be joined to the core 200 by positioning at least a first portion of the panel attachment hardware 70 in the first interface 290 during manufacture of the core 200. The first adhesive 280 may adhesively bond the first portion of the panel attachment hardware 70 to at least one of the first body 220 and/or the second body 240. A second portion of the panel attachment hard 70, which extends from the first portion of the panel attachment hardware 70, may extend beyond the side surface 203 of the core 200. Once the panel attachment hardware 70 is coupled to the core 200, the veneer facing layer 300 may be coupled to the core 200—as previously discussed.

In other embodiments, the panel attachment hardware 70 may inserted through the veneer facing layer and fastened thereto with a fastener. In a non-limiting example, the panel attachment hardware 70 may be inserted into and anchored to the core 200. In other embodiments, the building panel 100 may comprise an edge geometry that integrally forms an attachment portion configured to attached to the struts 5 of the support structure 7. In a non-limiting embodiment, the edge geometry may comprise a hook-shaped notch extending into one of the side major exposed surfaces 113 of the building panel 100.

The substrate 303 may be formed of the organic material. Non-limiting examples of organic material include cellulosic material or a polymeric material. Non-limiting examples of cellulosic material include wood, paper, and the like. In a preferred embodiment, the substrate is formed of a wooden material—including but not limited to cherry, bamboo, oak, pine, and the like. In other embodiments, the substrate 303 may be formed of the inorganic material. Non-limiting examples of organic material include fiberglass.

The substrate 303 may comprise a decorative feature 309. In a non-limiting embodiment, the substrate is formed of a cellulosic material—such as wood—and the decorative feature 309 is wood grain. Non-limiting examples of polymeric material include polyester, polyurethane, polyolefin, and the like. In such embodiments, the decorative feature 309 may be a pre-determined design, logo, or pattern (i.e., repeating pattern).

The outer coating 306 may comprise a sealant composition that provides protection to the underlying substrate 303 from the surrounding room environment. In a non-limiting embodiment, the outer coating is a wooden sealant composition, which helps prevent the wooden substrate 303 of the veneer facing layer 300 from being overexposed to ambient moisture in the surrounding room environment. The outer coating 306 may be applied to the substrate 303 by spray coating, roll coating, dip coating, and the like. The outer coating 306 may be substantially transparent allowing for the decorative features 309 of the substrate 303 to be visible from each of the first major exposed surface 111, the second major exposed surface 112, and the side major exposed surface 113.

The outer coating 306 may be applied to the first major surface 306 of the substrate 303. The outer coating 306 may be applied to the first major surface 306 of the substrate 303 before the substrate 303 is attached to the core 200. In other embodiments, the outer coating 306 may be applied to the first major surface 306 of the substrate 303 after the substrate 303 is attached to the core 200. After application of the outer coating 306 to the substrate 303, the plurality of perforations 390 remain open between the inner surface 302 and the outer surface 301 of the overall veneer facing layer 300 to allow for sufficient airflow through the veneer facing layer 300.

As described in greater detail herein, the veneer facing layer 300 may be coupled to the core 200 by one or more of adhesive, fastener, or the like. In a preferred embodiment, the veneer facing layer 300 may be adhesively bonded to the core 200. Specifically the inner surface 301 of the veneer facing layer 300 may be adhesively bonded to one or more of the first major surface 201, the second major surface 202, and/or the side surface 203 of the core 200.

The veneer facing layer 300 may comprise a first portion 310 having an outer surface 311 opposite an inner surface 312. The first portion 310 of the veneer facing layer 300 may comprise a plurality of perforations 390 extending between the inner surface 312 and the outer surface 311 of the first portion 310 of the veneer facing layer 300.

The first portion 310 of the veneer facing layer 300 may be coupled to the first major surface 201 of the core 200. The first portion 310 of the veneer facing layer 300 may be coupled to the first body 220 of the core 200. Specifically, the inner surface 312 of the first portion 310 of the veneer facing layer 300 and the first major surface 221 of the first body 220 may be joined together to form a second interface 291. A second adhesive 281 may present in the second interface 291 such that the second adhesive 281 adhesively bonds the first portion 310 of the veneer facing layer 300 to the first body 220 of the core 200.

The second adhesive 281 may be present in the second interface 291 an amount ranging from about 3.0 $g/m^2$ to about 500 $g/m^2$—based on the total dry weight of the second adhesive 281—including all amounts and sub-ranges there-between. In some embodiments, the second adhesive 281 may be present in the second interface 291 an amount ranging from about 5.0 $g/m^2$ to about 500 $g/m^2$—based on the total dry weight of the second adhesive 281—including all amounts and sub-ranges there-between. In a preferred embodiment, the second adhesive 281 may be present in the second interface 291 an amount ranging from about 20 $g/m^2$ to about 200 $g/m^2$—based on the total dry weight of the second adhesive 281—including all amounts and sub-ranges there-between.

The second adhesive 281 may comprise a polymer binder. Non-limiting examples of the polymer binder in the second adhesive 281 may include polyvinyl acetate, polyurethane, epoxy, acrylic, natural or synthetic rubber, silicone, and combinations thereof. The second adhesive 281 may be applied in a wet-state further comprising a liquid carrier. Non-limiting examples of liquid carrier include water and/or organic solvent. In other embodiments, the second adhesive 281 may be applied in a flowable form, whereby the composition comprises substantially no liquid carrier, but the polymer binder is present in a lower viscosity, uncured form—whereby after application, the polymer binder cures and hardens into a solid, dry-state second adhesive 281. In a non-limiting embodiment, the second adhesive 281 may be a hot-melt adhesive.

In forming the building panel 100, the second adhesive 281 may be applied in the wet-state directly to the first major surface 221 of the first body 220. In other embodiments, the building panel 100 may be formed by applying the second adhesive 281 directly to the inner surface 312 of the first portion 310 of the veneer facing layer 300. In other embodiments, the second adhesive 281 may be applied directly to both the first major surface 221 of the first body 220 and the inner surface 312 of the first portion 310 of the veneer facing layer 300.

The second adhesive 281 may be applied by spray coating, roll coating, dip coat, curtain coating, and the like.

The second adhesive 281 may be applied continuously. In other embodiments, the second adhesive 281 may be applied discontinuously—for example, in streaks across at least one of the first major surface 221 of the first body 220 and/or the inner surface 312 of the first portion 310 of the veneer facing layer 300. The second adhesive 281 may be applied such that the plurality of perforations 390 present on the first portion 310 of the veneer facing layer 300 are not blocked by the second adhesive 281.

After application, the second adhesive 281 may be present on the first major surface 221 of the first body 220. After application, the second adhesive 281 may penetrate into the first body 220 from the first major surface 221 at a depth equal to about 0.02 mm to about 13 mm as measured from the first major surface 221 of the first body 220—including all depths and sub-ranges there-between.

Once the second adhesive 281 is applied, the first major surface 221 of the first body 220 and the inner surface 312 of the first portion 310 of the veneer facing layer 300 may be brought together, thereby forming the second interface 291 where the second adhesive 281 is present in the second interface 291. The second adhesive 281 may be applied in a wet-state and after the first body 220 and the first portion 310 of the veneer facing layer 300 are brought together, the second adhesive 281 may dry and/or cure, thereby adhesively bonding the first body 220 and the first portion 310 of the veneer facing layer 300 at the second interface 281. The second adhesive 281 may be dried and/or cured in the second interface 291 at room temperature. In other embodiments, the second adhesive 281 in the second interface 291 may be dried and/or cured at an elevated temperature ranging from about 40° C. to about 300° C.—including all temperatures and sub-ranges there-between.

The second interface 291—as defined by the volume between the first major surface 221 of the first body 220 and the inner surface 312 of the first portion 310 of the veneer facing layer 300—may include only the second adhesive 281. Stated otherwise, the second interface 291 may be substantially free of any intermediate layers or intermediate components other than the second adhesive 281. The second interface 291 may be formed between the second major surface 305 of the substrate 303 of the first portion 310 of the veneer facing layer 300 and first major surface 201 of the core 200.

The outer surface 311 of the first portion 310 of the veneer facing layer 300 may form the first major exposed surface 111 of the building panel 100. The perforations 390 may extend from the first major exposed surface 111 of the building panel 100 to the first major surface 201 of the core 200.

The first portion 310 of the veneer facing layer 300 may have a first veneer length $L_{V1}$ and a first veneer width $W_{V1}$. The first veneer length $L_{V1}$ may be substantially equal to the first length $L_1$ of the first body 220. The first veneer width $W_{V1}$ may be substantially equal to the first width $W_1$ of the first body 220.

The veneer facing layer 300 may comprise a second portion 320 having an outer surface 321 opposite an inner surface 322. The second portion 320 of the veneer facing layer 300 may comprise a plurality of perforations 390 extending between the inner surface 322 and the outer surface 321 of the second portion 320 of the veneer facing layer 300.

The second portion 320 of the veneer facing layer 300 may be coupled to the second major surface 202 of the core 200. The second portion 320 of the veneer facing layer 300 may be coupled to the second body 240 of the core 200. Specifically, the inner surface 322 of the second portion 320 of the veneer facing layer 300 and the second major surface 242 of the second body 240 may be joined together to form a third interface 292. A third adhesive 282 may present in the third interface 292 such that the third adhesive 282 adhesively bonds the second portion 320 of the veneer facing layer 300 to the second body 240 of the core 200.

The third adhesive 282 may be present in the third interface 292 an amount ranging from about 5.0 g/m$^2$ to about 500.0 g/m$^2$—based on the total dry weight of the third adhesive 282—including all amounts and sub-ranges there-between. In a preferred embodiment, the third adhesive 282 may be present in the third interface 292 an amount ranging from about 20.0 kg/m$^2$ to about 200.0 kg/m$^2$—based on the total dry weight of the third adhesive 282—including all amounts and sub-ranges there-between.

The third adhesive 282 may comprise a polymer binder. Non-limiting examples of the polymer binder in the third adhesive 282 may include polyvinyl acetate, polyurethane, epoxy, acrylic, natural or synthetic rubber, silicone, and mixtures thereof. The third adhesive 282 may be applied in a wet-state further comprising a liquid carrier. Non-limiting examples of liquid carrier include water and/or organic solvent. In other embodiments, the third adhesive 282 may be applied in a flowable form, whereby the composition comprises substantially no liquid carrier, but the polymer binder is present in a lower viscosity, uncured form—whereby after application, the polymer binder cures and hardens into a solid, dry-state third adhesive 282. In a non-limiting embodiment, the third adhesive 282 may be a hot-melt adhesive.

In forming the building panel 100, the third adhesive 282 may be applied in the wet-state directly to the second major surface 242 of the second body 240. In other embodiments, the building panel 100 may be formed by applying the third adhesive 282 directly to the inner surface 322 of the second portion 320 of the veneer facing layer 300. In other embodiments, the third adhesive 282 may be applied directly to both the second major surface 242 of the second body 240 and the inner surface 322 of the second portion 320 of the veneer facing layer 300.

The third adhesive 282 may be applied by spray coating, roll coating, dip coat, curtain coating, and the like.

The third adhesive 282 may be applied continuously. In other embodiments, the third adhesive 282 may be applied discontinuously—for example, in streaks across at least one of the second major surface 242 of the second body 240 and/or the inner surface 322 of the second portion 320 of the veneer facing layer 300. The third adhesive 282 may be applied such that the plurality of perforations 390 present on the second portion 320 of the veneer facing layer 300 are not blocked by the third adhesive 282.

After application, the third adhesive 282 may be present on the second major surface 242 of the second body 240. After application, the third adhesive 282 may penetrate into the second body 240 from the second major surface 242 at a depth equal to about 0.02 mm to about 13 mm as measured from the second major surface 242 of the second body 240—including all depths and sub-ranges there-between.

Once the third adhesive 282 is applied, the second major surface 242 of the second body 240 and the inner surface 322 of the second portion 320 of the veneer facing layer 300 may be brought together, thereby forming the third interface 292 where the third adhesive 282 is present in the third interface 292. The third adhesive 282 may be applied in a wet-state and after the second body 240 and the second portion 320 of the veneer facing layer 300 are brought together, the third adhesive 282 may dry and/or cure, thereby adhesively bonding the second body 240 and the second portion 320 of the veneer facing layer 300 at the third interface 282. The third adhesive 282 may be dried and/or cured in the third interface 292 at room temperature. In other embodiments, the third adhesive 282 in the third interface 292 may be dried and/or cured at an elevated temperature ranging from about 40° C. to about 300° C.—including all temperatures and sub-ranges there-between.

The third interface 292—as defined by the volume between the second major surface 242 of the second body 240 and the inner surface 322 of the second portion 320 of the veneer facing layer 300—may include only the third adhesive 282. Stated otherwise, the third interface 292 may be substantially free of any intermediate layers or intermediate components other than the third adhesive 282. The third interface 292 may be formed between the second major surface 305 of the substrate 303 of the second portion 320 of the veneer facing layer 300 and the second major surface 202 of the core 200.

The outer surface 321 of the second portion 320 of the veneer facing layer 300 may form the second major exposed surface 112 of the building panel 100. The perforations 390 may extend from the second major exposed surface 112 of the building panel 100 to the second major surface 202 of the core 200.

The second portion 320 of the veneer facing layer 300 may have a second veneer length $L_{V2}$ and a second veneer width $W_{V2}$. The second veneer length $L_{V2}$ may be substantially equal to the second length $L_2$ of the second body 240.

The second veneer width $W_{V2}$ may be substantially equal to the second width $W_2$ of the second body 240.

The veneer facing layer 300 may comprise a third portion 330 having an outer surface 331 opposite an inner surface 332. The third portion 330 of the veneer facing layer 300 may comprise a plurality of perforations 390 extending between the inner surface 332 and the outer surface 331 of the third portion 330 of the veneer facing layer 300.

The third portion 330 of the veneer facing layer 300 may be coupled to the side surface 203 of the core 200. The third portion 330 of the veneer facing layer 300 may be coupled to both the first body 220 and the second body 240 of the core 200. Specifically, the inner surface 332 of the third portion 330 of the veneer facing layer 300 may be joined to both the side surface 223 of the first body 220 and the side surface 243 of the second body 240 to form a fourth interface 293. A fourth adhesive 283 may present in the fourth interface 293 such that the fourth adhesive 283 adhesively bonds the third portion 330 of the veneer facing layer 300 to the side surface 203 of the core 200. The fourth adhesive 283 may present in the fourth interface 293 such that the fourth adhesive 283 adhesively bonds the third portion 330 of the veneer facing layer 300 to the side surface 223 of the first body 220 and the side surface 243 of the second body 240.

The fourth adhesive 283 in the dry-state may be present in the fourth interface 293 an amount ranging from about 5.0 $g/m^2$ to about 500.0 $g/m^2$—including all amounts and sub-ranges there-between. In a preferred embodiment, the fourth adhesive 283 in the dry-state may be present in the fourth interface 293 an amount ranging from about 20.0 $g/m^2$ to about 200.0 $g/m^2$—including all amounts and sub-ranges there-between.

The fourth adhesive 283 may comprise a polymer binder. Non-limiting examples of the polymer binder in the first adhesive may include polyvinyl acetate, polyurethane, epoxy, acrylic, natural or synthetic rubber, silicone, and mixtures thereof. The fourth adhesive 283 may be applied in a wet-state further comprising a liquid carrier. Non-limiting examples of liquid carrier include water and/or organic solvent. In other embodiments, the fourth adhesive 283 may be applied in a flowable form, whereby the composition comprises substantially no liquid carrier, but the polymer binder is present in a lower viscosity, uncured form—whereby after application, the polymer binder cures and hardens into a solid, dry-state fourth adhesive 283. In a non-limiting embodiment, the fourth adhesive 283 may be a hot-melt adhesive.

In forming the building panel 100, the fourth adhesive 283 may be applied in the wet-state directly to the side surface 203 of the core—specifically, the side surface 223 of the first body and/or the side surface 243 of the second body 240. In other embodiments, the building panel 100 may be formed by applying the fourth adhesive 283 directly to the inner surface 332 of the third portion 330 of the veneer facing layer 300. In other embodiments, the fourth adhesive 283 may be applied directly to inner surface 332 of the third portion 330 of the veneer facing layer 300 as well as the side surface 223 of the first body 220 and/or the side surface 243 of the second body 240.

The fourth adhesive 283 may be applied by spray coating, roll coating, dip coat, curtain coating, and the like.

The fourth adhesive 283 may be applied continuously. In other embodiments, the fourth adhesive 283 may be applied discontinuously—for example, in streaks across at least one of the side surface 203 of the core and/or the inner surface 332 of the third portion 330 of the veneer facing layer 300.

The fourth adhesive 283 may be applied such that the plurality of perforations 390 present on the third portion 330 of the veneer facing layer 300 are not blocked by the fourth adhesive 283.

After application, the fourth adhesive 283 may be present on the side surface 223 of the first body 220 and/or the side surface 243 of the second boy 240. After application, the fourth adhesive 283 may penetrate into the first body 220 from the side surface 223 at a depth equal to about 0.02 mm to about 13 mm as measured from the side surface 223 of the first body 220—including all depths and sub-ranges there-between. After application, the fourth adhesive 283 may penetrate into the second body 240 from the side surface 243 at a depth equal to about 0.02 mm to about 13 mm as measured from the side surface 243 of the second body 240—including all depths and sub-ranges there-between.

Once the fourth adhesive 283 is applied, the side surface 203 of the core 200 and the inner surface 332 of the third portion 330 of the veneer facing layer 300 may be brought together, thereby forming the fourth interface 293 where the fourth adhesive 283 is present in the fourth interface 293. Once the fourth adhesive 283 is applied, the inner surface 332 of the third portion 330 of the veneer facing layer 300 may be brought together with the side surface 223 of the first body 220 and the side surface 243 of the second body 240 to form the fourth interface 293 where the fourth adhesive 283 is present in the fourth interface 293.

The fourth adhesive 283 may be applied in a wet-state and dried and/or cured to adhesively bonding the third portion 330 of the veneer facing layer 300 to the side surface 203 of the core 300. The fourth adhesive 283 may be dried and/or cured in the fourth interface 293 at room temperature. In other embodiments, the fourth adhesive 283 in the fourth interface 293 may be dried and/or cured at an elevated temperature ranging from about 40° C. to about 300° C.—including all temperatures and sub-ranges there-between.

The fourth interface 293—as defined by the volume between side surface 203 of the core 200 and the inner surface 332 of the third portion 330 of the veneer facing layer 300—may include only the fourth adhesive 283 and any portion of the panel attachment hardware 70 that extends into the building panel 100. Stated otherwise, the fourth interface 293 may be substantially free of any intermediate layers or intermediate components other than the fourth adhesive 283 and any portion of panel attachment hardware 70. The fourth interface 293 may be formed between the major surface 305 of the substrate 303 of the third portion 330 of the veneer facing layer 300 and the second major surface 202 of the core 200.

The outer surface 331 of the third portion 330 of the veneer facing layer 300 may form the side major exposed surface 113 of the building panel 100. The perforations 390 may extend from the side major exposed surface 113 of the building panel 100 to the side surface 203 of the core 200.

A first one of the third portion 330 of the veneer facing layer 300 may form the first side exposed surface 113*a* of the building panel 100. A second one of the third portion 330 of the veneer facing layer 300 may form the second side exposed surface 113*b* of the building panel 100. A third one of the third portion 330 of the veneer facing layer 300 may form the third side exposed surface 113*c* of the building panel 100. A fourth one of the third portion 330 of the veneer facing layer 300 may form the fourth side exposed surface 113*d* of the building panel 100.

The first one of the third portion 330 of the veneer facing layer 300 may have a length that is substantially equal to the first veneer length $L_{V1}$ and/or the second veneer length $L_{V2}$. The first one of the third portion 330 of the veneer facing layer 300 may have a width that is substantially equal to the panel thickness $t_P$.

The second one of the third portion 330 of the veneer facing layer 300 may have a length that is substantially equal to the first veneer length $L_{V1}$ and/or the second veneer length $L_{V2}$. The second one of the third portion 330 of the veneer facing layer 300 may have a width that is substantially equal to the panel thickness $t_P$.

The third one of the third portion 330 of the veneer facing layer 300 may have a length that is substantially equal to the first veneer width $W_{V1}$ and/or the second veneer width $W_{V2}$. The third one of the third portion 330 of the veneer facing layer 300 may have a width that is substantially equal to the panel thickness $t_P$.

The fourth one of the third portion 330 of the veneer facing layer 300 may have a length that is substantially equal to the first veneer width $W_{V1}$ and/or the second veneer width $W_{V2}$. The fourth one of the third portion 330 of the veneer facing layer 300 may have a width that is substantially equal to the panel thickness $t_P$.

The panel thickness $t_P$ may be substantially equal to the sum of the veneer thickness $t_3$ of the first portion 310 of the veneer facing layer 300, the core thickness to, and the veneer thickness $t_3$ of the second portion 320 of the veneer facing layer 300.

The panel thickness $t_P$ may be substantially equal to the sum of the veneer thickness $t_3$ of the first portion 310 of the veneer facing layer 300, the first thickness $t_1$ of the first body 220, the second thickness $t_2$ of the second body 240, and the veneer thickness $t_3$ of the second portion 320 of the veneer facing layer 300

The panel width $W_P$ may be substantially equal to the sum of the veneer thickness $t_3$ of the first one of the third portion 330 of the veneer facing layer 300, the core width $W_0$, and the veneer thickness $t_3$ of the second one of the third portion 330 of the veneer facing layer 300.

The panel width $W_P$ may be substantially equal to the sum of the veneer thickness $t_3$ of the first one of the third portion 330 of the veneer facing layer 300, the first width $W_1$ of the first body 220, and the veneer thickness $t_3$ of the second one of the third portion 330 of the veneer facing layer 300.

The panel width $W_P$ may be substantially equal to the sum of the veneer thickness $t_3$ of the first one of the third portion 330 of the veneer facing layer 300, the second width $W_2$ of the second body 240, and the veneer thickness $t_3$ of the second one of the third portion 330 of the veneer facing layer 300.

The combination of the core 200 and the veneer facing layer 300 result in the building panels 100 of the present invention having noise reducing characteristics, which can be measured in sabins/ft$^2$. A sabin is a unit of sound measurement that indicates how well one square foot of any surface texture in a room is able to absorb sound reflections. A sabin value can be calculated using ASTM test method C423-17. The testing measures the total noise absorption in a room environment, divided by the amount of individual building panels 100 units and reported as total absorption (Sabins) per unit. The discrete building panel units will be installed in the reverberant room in a similar way to how they are intended to be installed in the field and subjected to sound at different octave bands (100, 125, 160, 200, 250, 315, 400, 500, 630, 800, 1000, 1250, 1600, 2000, 2500, 3150, 4000, and 5000 Hz)—the spectrum of data is averaged so that the performance can be simplified to a single number and reported in terms of Sabins per unit.

The individual Sabins per unit value may further be converted into a per-surface area unit by dividing by the total surface area of the panel(s) that was/were used during the sabin test to provide a sabin/ft$^2$ value. The higher the sabin/ft$^2$ value, the greater the noise reducing characteristics of the building panel. The building panel 100 of the present invention may exhibit a Sabins/ft$^2$ value ranging from about 3.23 Sabins/m$^2$ to about 7.53 Sabins/m$^2$—including all values and sub-ranges there-between. In some embodiments, the building panel 100 of the present invention may exhibit a Sabins/ft$^2$ value ranging from about 4.31 Sabins/m$^2$ to about 7.0 Sabins/m$^2$—including all values and sub-ranges there-between. The building panel 100 of the present invention may exhibit a Sabins/ft$^2$ value ranging from about 5.38 Sabins/m$^2$ to about 7.0 Sabins/m$^2$—including all values and sub-ranges there-between.

EXAMPLES

Experiment 1

A first experiment was performed to test the dimensional stability of the building panel according to the present invention.

The experiment included preparing a number of panels according to the present invention (Examples 1-4) that were constructed with a dual layer core comprising a first body and a second body—each formed from mineral wool—whereby the first and second bodies were coupled together using a first adhesive. A cellulosic veneer facing layer was applied to the first and second major surfaces of the core by a second adhesive.

A number of comparative panels (Comp 1-2) were constructed with a single layer core comprising a single body formed from mineral wool. A cellulosic veneer facing layer was applied to the first and second major surfaces of the single body core by a second adhesive.

Additionally, a control panel (Control) was prepared being formed entirely of cellulosic material—specifically laminate plywood board.

Each panel was then subjected to a moisture test, whereby the deflection of each panel was measured after being subjected to environmental conditions of 85° F. and 85% Relative Humidity ("RH") for a period of 14 days. The results of the test are set forth below in Table 1.

TABLE 1

| | Ex. 1 | Ex. 2 | Ex. 3 | Ex. 4 | Comp. Ex. 1 | Comp. Ex. 2 | Control 1 |
|---|---|---|---|---|---|---|---|
| Dual Body Core | Y | Y | Y | Y | N | N | — |
| Single Body Core | N | N | N | N | Y | Y | — |
| Panel Length | 4' | 4' | 8' | 8' | 4' | 8' | 4' |
| Moisture Test | Pass | Pass | Pass | Pass | Fail | Fail | Fail |
| Relative Panel Weight Compared to Control Panel | Less | Less | Less | Less | Less | Less | — |

Each panel was evaluated for deflection, with a passing grade being assigned to panels that exhibited equal to or less than about +0.51 mm. As demonstrated by Table 1, the dual body core imparted an additional amount of dimensional stability to the resulting building panels that was not present in the comparative panels or the control panel. The dimensional stability was present in both the 122 cm length panels as well as the 244 cm panels. Additionally, the dual layer core of Examples 1-4 resulted in an overall building panel that weighed less than the wooden control panel. Furthermore, the veneer facing layers formed of cellulosic material are particularly susceptible to deformation—therefore, the building panels of the present invention exhibiting the dimensional stability of having deflection of less than about 0.51 mm when using a cellulosic veneer was surprising considering the expected issues associated with such cellulosic materials.

Experiment 2

A second experiment was performed to test the dimensional stability of the building panel having a perforated veneer facing layer vs. a non-perforated veneer facing layer. Each building panel of this experiment was constructed using a dual layer core comprising a first body and a second body—each formed from mineral wool—whereby the first and second bodies were coupled together using a first adhesive. A perforated cellulosic veneer facing layer was then applied to a first set of the cores to form the building panels of Examples 5 and 6. A non-perforated cellulosic veneer facing layer was then applied to a second set of the cores to form the building panels of Examples 7 and 8.

Additionally, a number of control panels were prepared and tested, whereby each control panel was formed entirely from cellulosic material. Specifically, a second control panel (Control 2) was formed entirely from solid Hemlock wood and a third control panel (Control 3) was formed entirely from solid Douglas Fir wood.

Each of the building panels were then subjected to a number of environmental conditions and then evaluated for dimensional stability. The first environmental test included a heat test, whereby the panels were subjected to a temperature of 115° F. and a RH of 19% for a period of 14 days. The second environmental test included a moisture test, whereby the panels were subjected to a temperature of 85° F. and a RH of 85% for a period of 14 days. The amount of deflection for each panel is set forth below in Table 2.

TABLE 2

| | Ex. 5 | Ex. 7 | Ex. 6 | Ex. 8 | Control 2 | Control 3 |
|---|---|---|---|---|---|---|
| Perforated Veneer | Y | N | Y | N | — | — |
| Non-Perforated Veneer | N | Y | N | Y | — | — |
| Panel Length | 4' | 4' | 6' | 6' | 6' | 6' |
| Ambient Test | | | | | | |
| Average Deflection (mm) | +0.185 | +0.345 | +0.058 | +0.211 | — | — |
| Moisture Test | | | | | | |
| Average Deflection (mm) | +0.457 | +0.566 | +0.516 | +0.777 | +1.829 | +0.711 |
| Heat Test | | | | | | |
| Average Deflection (mm) | −0.142 | +0.030 | −0.109 | + 0.058 | — | — |
| Acoustical Performance | | | | | | |
| Sabins/m$^2$ | 6.89 | 0.75 | — | — | 0.0 | 0.0 |

Each panel was evaluated for the amount of deflection in mm. As demonstrated by Table 2, the presence of the perforations on the veneer facing layers imparted an improvement in dimensional stability compared to the veneer facing layers that did not contain perforations. The improved dimensional stability was observed in both overall reduced deflection in both the moisture and heat tests—whereby the dimensional stability was more pronounced as the panel became longer. Additionally, the control panels exhibited very poor dimensional stability in the moisture test.

As also demonstrated by Table 2, each panel was evaluated for sound adsorption properties. The panels comprising perforated veneer layers (Example 5) exhibits superior sound absorption compared to the non-perforated panels. Thus, the present invention represents an unexpected synergy between improved dimensional and superior acoustical absorption characteristics. Furthermore, the control panels exhibit no measurable sound absorption.

What is claimed is:

1. A ceiling system comprising:

a support structure;

at least one building panel coupled to the support structure, the building panel comprising a first major surface opposite a second major surface and a side surface extending between the first and second major surfaces, each of the building panel comprising:

a core comprising:

a first body comprising a first fibrous material, the first body defining the first major surface and a portion of the side surface;

a second body coupled directly to the first body, the second body comprising a second fibrous material, the second body defining the second major surface and a portion of the side surface;

a veneer facing layer coupled to the core, the veneer facing layer comprising:

a first portion defining the first major surface of the building panel;

a second portion defining the second major surface of the building panel; and a third portion defining the side surface of the building panel;

wherein the first portion, the second portion, and the third portion are separate pieces individually coupled to the core;

wherein the first body has a first density, the second body has a second density, and the veneer facing layer has a third density, wherein the third density is greater than the first and second densities; and wherein the building panel is positioned vertically within the ceiling system.

2. The ceiling system according to claim 1, wherein an interface exists between the first body and the second body, and adhesive is present in the interface.

3. The ceiling system according to claim 1, wherein a first side surface of the building panel faces upward and a second side surface of each building panel faces downward.

4. The ceiling system according to claim 1 further comprising mounting hardware coupled to the building panel, the mounting hardware configured to attach to the support structure.

5. The ceiling system according to claim 1, wherein the veneer facing layer is adhesively bonded to the core.

6. The ceiling system according to claim 1, wherein the veneer facing layer comprising a plurality of perforations.

7. The ceiling system according to claim 6, wherein the veneer facing layer comprises an inner surface opposite an outer surface, and the plurality of perforations extend between the inner surface and the outer surface.

8. The ceiling system according to claim 6, wherein the perforations have an average diameter ranging from about 0.02 mm to about 12.7 mm.

9. The ceiling system according to claim 6, wherein the perforations are present across the veneer facing layer in a density ranging about 0.01 hole/cm$^2$ to about 30.0 hole/cm$^2$.

10. The ceiling system according to claim 1, wherein the first fibrous material and the second fibrous material comprise inorganic fiber that is selected from one or more of mineral wool, rock wool, stone wool, and fiberglass.

11. The ceiling system according to claim 1, wherein the veneer facing layer comprises a cellulosic material.

12. The ceiling system according to claim 1, wherein the first body exhibits an NRC coefficient of at least 0.3.

13. The ceiling system according to claim 1, wherein the second body exhibits an NRC coefficient of at least 0.3.

14. A ceiling system comprising:
a support structure;
a building panel coupled to the support structure, the building panel comprising:
a core having a first surface opposite a second surface and a third surface extending between the first and second surfaces, the core comprising:
a first body comprising a first fibrous material, the first body defining a first major surface and a portion of a side surface;
a second body coupled directly to the first body, the second body comprising a second fibrous material, the second body defining a second major surface and a portion of the side surface; and
a veneer facing layer coupled to the core, the veneer facing layer comprising:
a first portion coupled to the first surface of the core;
a second portion coupled to the second surface of the core; and
a third portion coupled to the third surface of the core;
wherein the first portion, the second portion, and the third portion are separate pieces individually coupled to the core;
wherein at least one of the first portion or the second portion comprises a plurality of perforations;
wherein the third portion comprises a plurality of perforations;
wherein the first body has a first density, the second body has a second density, and the veneer facing layer has a third density, wherein the third density is greater than the first and second densities; and
wherein the first surface, the second surface, and the third surface of the core are entirely concealed by the first portion, the second portion, and the third portion of the veneer facing layer.

15. The ceiling system according to claim 14, wherein the building panel is positioned vertically within the ceiling system.

16. The ceiling system of claim 14, wherein the first portion and the second portion comprise a plurality of perforations.

17. A ceiling system comprising:
a support structure;
a building panel coupled to the support structure, the building panel comprising:
a first major surface opposite a second major surface and a side surface extending between the first and second major surfaces;
a core comprising:
a first body comprising a first fibrous material, the first body defining the first major surface and a portion of the side surface;
a second body comprising a second fibrous material, the second body defining the second major surface and a portion of the side surface;
an interface defined between the first and second porous bodies; and
an adhesive present at the interface, the adhesive coupling the first body directly to the second body; and
a veneer facing layer coupled to the core, the veneer facing layer comprising a plurality of perforations;
wherein the veneer facing layer defines the first major surface, the second major surface, and the side surface of the building panel;
wherein the veneer facing layer is coupled to the core with an adhesive applied such that the plurality of perforations are not blocked by the adhesive;
wherein the first body has a first density, the second body has a second density, and the veneer facing layer has a third density, wherein the third density is greater than the first and second densities; and
wherein the building panel is positioned vertically within the ceiling system.

18. The ceiling system of claim 17, wherein the plurality of perforations are present across the first major surface, the second major surface, and the side surface of the building panel.

* * * * *